(12) United States Patent
Rupavatharam et al.

(10) Patent No.: US 10,887,282 B1
(45) Date of Patent: Jan. 5, 2021

(54) DETERMINING SYNCHRONIZATION OF FILTER RULES (E.G., ON IPTABLE FILTER TABLES ON LINUX KERNAL) ACROSS FIREWALL FILTER APPLICATION RESTARTS

(71) Applicant: Juniper Networks, Inc., Sunnyvale, CA (US)

(72) Inventors: Sreekanth Rupavatharam, Campbell, CA (US); Prashant Singh, Santa Clara, CA (US); Hariprasad Shanmugam, Kanata (CA)

(73) Assignee: Juniper Networks, Inc., Sunnyvale, CA (US)

( * ) Notice: Subject to any disclaimer, the term of this patent is extended or adjusted under 35 U.S.C. 154(b) by 214 days.

(21) Appl. No.: 16/166,030

(22) Filed: Oct. 19, 2018

(51) Int. Cl.
*G06F 21/00* (2013.01)
*H04L 29/06* (2006.01)
*H04L 12/26* (2006.01)
*G06F 16/22* (2019.01)

(52) U.S. Cl.
CPC ...... *H04L 63/0263* (2013.01); *G06F 16/2255* (2019.01); *H04L 43/028* (2013.01)

(58) Field of Classification Search
CPC ........... G06F 2221/2119; G06F 15/173; G06F 21/55; G06F 21/577; G06F 2221/2113
See application file for complete search history.

*Primary Examiner* — Ghazal B Shehni
(74) *Attorney, Agent, or Firm* — John C. Pokotylo; Pokotylo Patent Services

(57) ABSTRACT

Filter synchronization across a restart of a firewall filter application for converting filter information for filters into corresponding iptables filter table rules, is ensured by (1) computing a hash value for filter information derived from a filter using the filter or information derived from the filter, (2) determining an iptables filter table rule using the filter information for the filter, (3) associating the hash value with the corresponding iptables filter table rule, and (4) adding the determined iptables filter table rule and the hash value to iptables filter table rules in a Linux kernel. When a restart of the firewall filter application is detected, (1) a current instance of filter information derived from a current instance of the filter is obtained, (2) a hash value for the current instance of filter information is computed using the current instance of the filter or information derived from the current instance of the filter, (3) the hash value for the filter information is obtained from the iptables rules, and (4) whether the hash value for the current instance of the filter information is the same as the hash value for the filter information is determined. If it is determined that the hash value for the current instance of the filter information is not the same as the hash value for the filter information, then (1) a new iptables rule for the current instance of the filter information is determined, and (2) the iptables filter rule and the hash value in the iptables rules is replaced with the new iptables rule and the hash value for the current instance of the filter information.

19 Claims, 15 Drawing Sheets

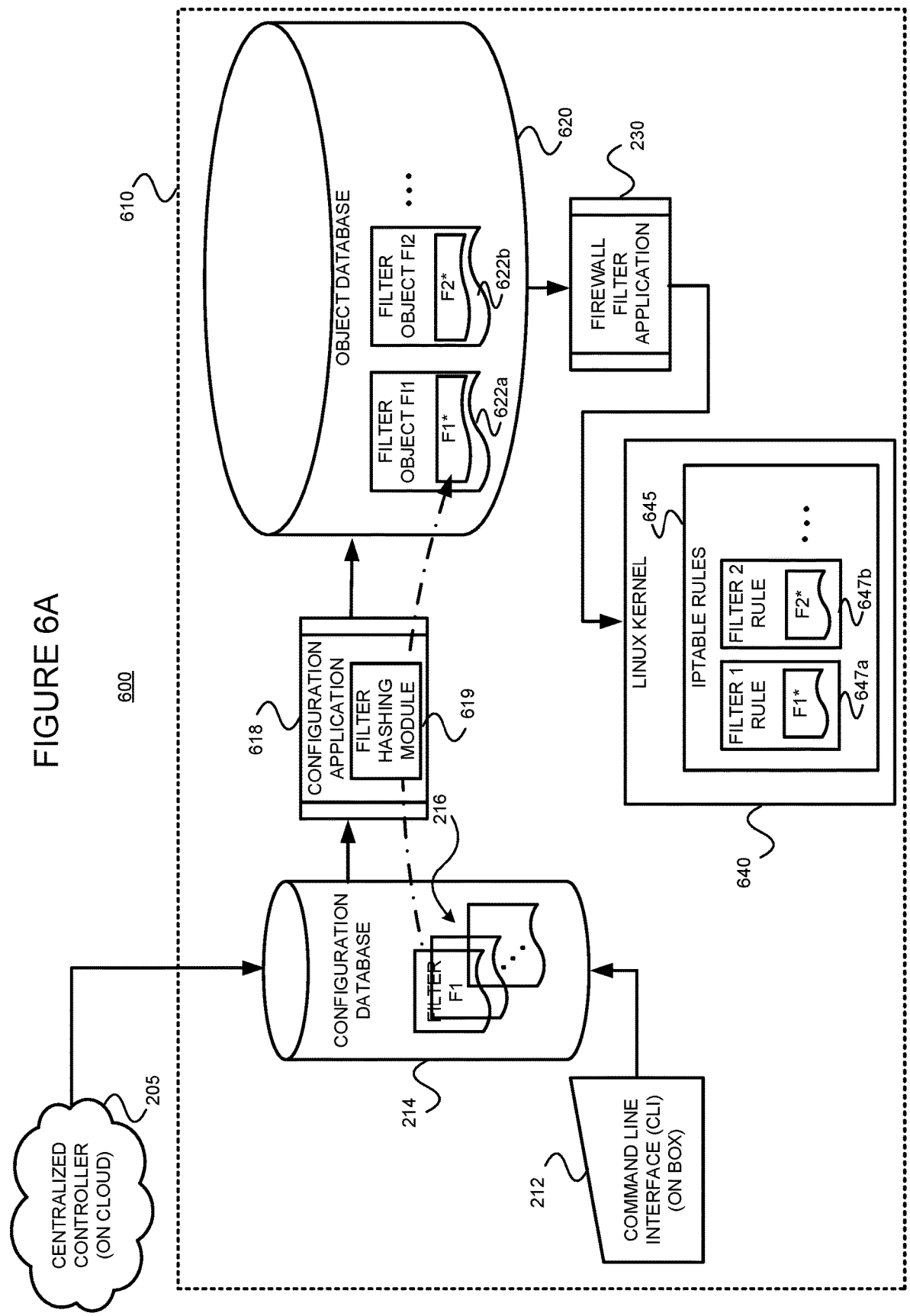

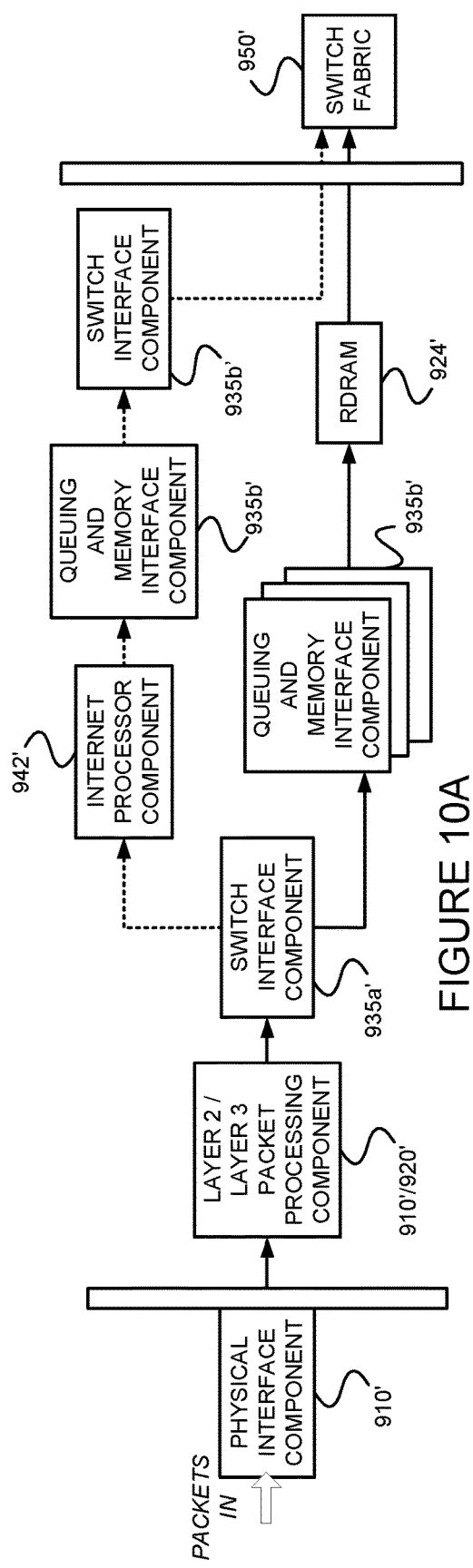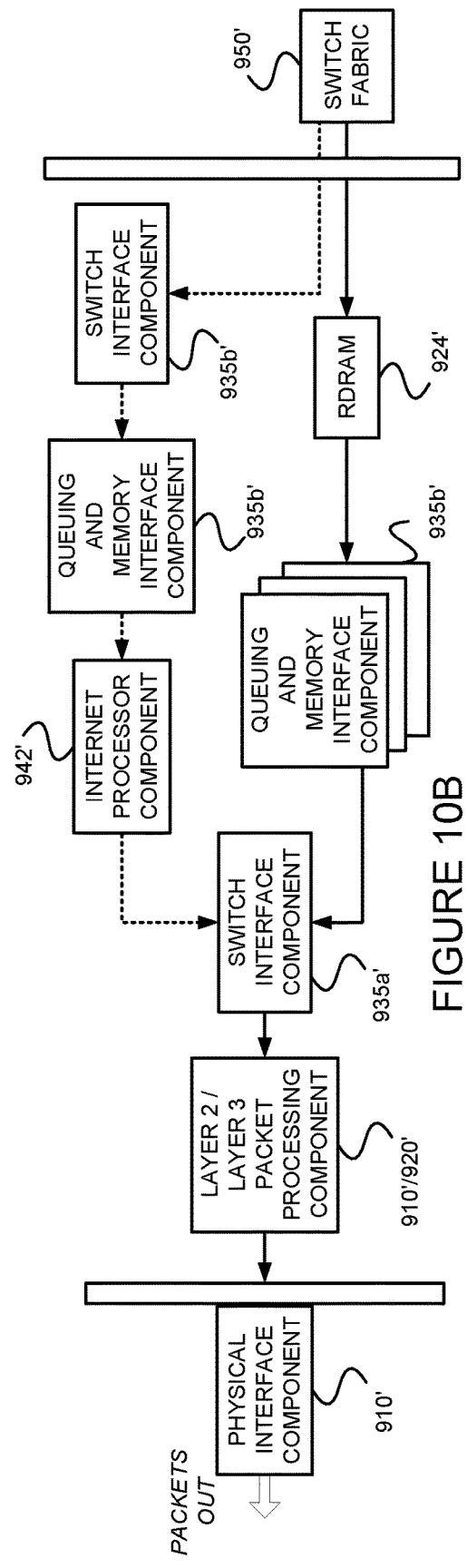

DETERMINING SYNCHRONIZATION OF FILTER RULES (E.G., ON IPTABLE FILTER TABLES ON LINUX KERNAL) ACROSS FIREWALL FILTER APPLICATION RESTARTS

§ 1. BACKGROUND OF THE INVENTION

§ 1.1 Field of the Invention

The present description concerns communications networks, and in particular, concerns firewall filters used in communications networks.

§ 1.2 Background Information

Firewalls are configured to protect servers and communications network infrastructure. Referring to FIG. 1, in the Linux open-source operating system ecosystem, "iptables" 150 is a widely used firewall tool that interfaces with the Linux kernel's "netfilter" packet filtering framework 110. The "iptables" firewall works by interacting with the packet filtering "hooks" 114, 116, 118 in the Linux kernel's networking stack 110. These kernel hooks are collectively referred to as the netfilter framework 110.

Every (incoming or outgoing) packet that enters networking system will trigger these packet filtering hooks 112,114, 116, 118, 119 as it progresses through the networking stack 100 of the Linux kernel, allowing programs (such as "chains" including "rules", as described later) that register with these hooks to interact with the packet traffic at key points (e.g. before routing, after routing (e.g., destined for the local system or for another host), upon creation of locally created outbound traffic as soon as such traffic hits the network stack, and after routing but just before forwarding).

Kernel modules associated with iptables 150 (including a "filter" iptables 152, described below) register at these packet filtering hooks 114, 116, 118 to ensure that the traffic conforms to the conditions laid out by firewall rules included in one or more chains.

§ 1.2.1 Netfilter Hooks

Still referring to FIG. 1, there are five netfilter hooks in the Linux kernel's netfilter packet filtering framework 110 that kernel modules can register with. As packets progress through the Linux kernel's networking stack, they will trigger any kernel module(s) that has registered with the respective netfilter hooks. The hooks that a packet will trigger may depend on (A) whether the packet is incoming or outgoing, (B) the packet's destination, and/or (C) whether the packet was dropped or rejected at a previous point.

The following netfilter hooks represent various well-defined points in the networking stack 100:
  NF_IP_PRE_ROUTING 112: This netfilter hook will be triggered by any incoming traffic very soon after entering the Linux network stack. This hook is processed before any routing decisions have been made regarding where to send the packet.
  NF_IP_LOCAL_IN 114: This netfilter hook is triggered after an incoming packet has been routed if the packet is destined for the local system.
  NF_IP_FORWARD 116: This netfilter hook is triggered after an incoming packet has been routed if the packet is to be forwarded to another host.
  NF_IP_LOCAL_OUT 118: This netfilter hook is triggered by any locally created outbound traffic as soon it hits the network stack.
  NF_IP_POST_ROUTING 119: This netfilter hook is triggered by any outgoing or forwarded traffic after routing has taken place and just before being put out on the wire.

To register at these netfilter hooks, kernel modules provide a priority number to help determine the order in which they will be called when the hook is triggered. This allows multiple modules (or multiple instances of the same module) to be connected to each of the netfilter hooks 112, 114, 116, 118, 119 with deterministic ordering. Each kernel module will be called in turn, and will return a decision to the netfilter framework 110 after processing that indicates what should be done with the packet.

§ 1.2.2 Iptables Tables and Chains

The iptables 150 firewall uses tables to organize its rules. These tables classify rules according to the type of decisions they are used to make. For instance, if a rule deals with network address translation, it will be put into a NAT table 154. If the rule is used to decide whether to allow the packet to continue to its destination, it would probably be added to a "filter" table 152.

Within each iptables table 152, 154, 156, 158, 159, rules are further organized within separate "chains." While tables are defined by the general aim of the rules they hold, the built-in chains represent (and are registered with) the netfilter hooks which trigger them. Chains basically determine when rules within them will be evaluated. The names of the built-in chains mirror the names of the netfilter hooks 112, 114, 116, 118, 119 they are associated with:
  PREROUTING: This chain is triggered by the NF_IP_PRE_ROUTING netfilter hook 112.
  INPUT: This chain is triggered by the NF_IP_LOCAL_IN netfilter hook 114.
  FORWARD: This chain is triggered by the NF_IP_FORWARD netfilter hook 116.
  OUTPUT: This chain is triggered by the NF_IP_LOCAL_OUT netfilter hook 118.
  POSTROUTING: This chain is triggered by the NF_IP_POST_ROUTING netfilter hook 119.

Chains allow an administrator to control where, within a packet's delivery path, a rule is to be evaluated. Since each table can have multiple chains, a table's influence can be exerted at multiple points in processing of the packet. Since certain types of decisions only make sense at certain points in the Linux network stack 100, every table will not have a chain registered with each kernel hook. For example, a "filter" table 152 can only have chains registered with the NF_IP_LOCAL_IN hook 114, the NF_IP_FORWARD hook 116, and the NF_IP_LOCAL_OUT hook 118.

Recall that there are only five netfilter kernel hooks 112, 114, 116, 118, 119. Chains from multiple tables may be registered at each of the hooks. For instance, as described in more detail below, three tables ("raw" 158, "mangle" 156 and DNAT 154) have PREROUTING chains. When the PREROUTING chains of these tables register at the associated NF_IP_PRE_ROUTING hook 112, they specify a priority. These priorities are used to order the calling of each table's PREROUTING chain. Each of the rules inside the highest priority PREROUTING chain is evaluated sequentially before moving onto the PREROUTING chain with the next highest priority.

§ 1.2.2.2 Tables and their Chains

Different types of iptables 150 represent distinct sets of rules, organized by area of concern, for evaluating packets. The different types of iptables include (1) filter table 152, (2) NAT (DNAT and SNAT) tables 154, (3) mangle table 156, (4) raw table 158 and (5) security table 159. Although the present description concerns the filter table 152, each of the foregoing types of table is introduced below.

§ 1.2.2.2.1 The Filter Table

The filter table 152 is one of the most widely used tables in iptables 150. The filter table 152 is used to make decisions about whether to (A) let a packet continue to its intended destination, or (B) deny its request. This is commonly referred to as "filtering" packets. The filter table 152 provides the bulk of firewall functionality in many data forwarding devices (e.g., routers).

§ 1.2.2.2.2 The Nat Table

The nat table 154 is used to implement network address translation rules. As packets enter the Linux network stack 100, rules in the nat table 154 will determine whether and how to modify the packet's source and/or destination addresses in order to impact the way that the packet and any response traffic are routed. This is often used to route packets to networks when direct access is not possible.

§ 1.2.2.2.3 The Mangle Table

The mangle table 156 may be used to alter the IP headers of the packet in various ways. For instance, the TTL (Time to Live) value in the header of a packet can be adjusted by either lengthening or shortening the number of valid network hops the packet can sustain. Other IP headers can be altered in similar ways.

As will be discussed below, the mangle table 156 can also place an internal kernel "mark" on the packet for further processing in other tables and by other networking tools. This mark does not touch the actual packet, but adds the mark to the Linux kernel's representation of the packet.

§ 1.2.2.2.4 The Raw Table

The iptables firewall is stateful, which permits packets to be evaluated with respect to their relation to previous packets. The connection tracking features built on top of the netfilter framework 110 allow iptables 150 to view packets as part of an ongoing connection or session instead of as a stream of discrete, unrelated, packets. The connection tracking logic is usually applied very soon after the packet is received at the network interface.

The raw table 158 provides a mechanism for marking packets in order to opt-out of connection tracking.

§ 1.2.2.2.5 The Security Table

The security table 159 is used to set internal SELinux security context marks on packets, which will affect how SELinux or other systems that can interpret SELinux security contexts handle the packets. These marks can be applied on a per-packet or per-connection basis.

§ 1.2.2.3 Chains that May be Implemented in the Filter Table

As a packet triggers a netfilter hook 112, 114, 116, 118, 119, the associated chains will be processed, starting with the raw table 158, then the mangle table 156, the DNAT table 154, the filter table 152*e*, the security table 159 and finally the SNAT table 154. The hooks (columns) that a packet will trigger depend on whether it is an incoming or outgoing packet, the routing decisions that are made, and whether the packet passes filtering criteria. A chain of a filter table 152 may be triggered by the local-in hook 114, the forward hook 116 and the local-out hook 118 in the netfilter framework 110 of the Linux kernel.

§ 1.2.2.4 Chain Rules

Rules are placed within a specific chain of a specific table. As each chain is called, the packet in question will be checked against each rule within the chain in order. Each rule has (1) a "matching" component and (2) an "action" component.

The matching portion of a rule specifies the criteria that a packet must meet in order for the associated action (or "target") to be executed. The matching system is flexible and can be expanded significantly with iptables extensions available on the system. Rules can be constructed to match by protocol type, destination or source address, destination or source port, destination or source network, input or output interface, headers, or connection state among other criteria. These can be combined to create fairly complex rule sets to distinguish between different traffic.

The target or action portion of a rule is triggered when a packet meets the matching criteria of a rule. Targets are generally divided into two categories—(1) terminating targets and (2) non-terminating targets. Terminating targets perform an action which terminates evaluation within the chain and returns control to the netfilter hook 112, 114, 116, 118, 119. Depending on the return value provided, the hook might drop the packet or allow the packet to continue to the next stage of processing. Conversely, non-terminating targets perform an action and continue evaluation within the chain. Although each chain must eventually pass back a final terminating decision, any number of non-terminating targets can be executed beforehand.

The availability of each target within rules will depend on context. For instance, the table and chain type might dictate the targets available. The extensions activated in the rule and the matching clauses can also affect the availability of targets.

§ 1.2.2.5 Jumping to User-Defined Chains

The "jump" target is a special class of non-terminating target. Jump targets are actions that result in evaluation moving to a different chain for additional processing. Although some of the foregoing sections discussed the built-in chains intimately tied to the netfilter hooks 112, 114, 116, 118, 119 that call them, iptables 150 also allows administrators to create their own chains. More specifically, rules can be placed in user-defined chains in the same way that they can be placed into built-in chains. The difference is that user-defined chains can only be reached by "jumping" to them from a rule. (User-defined chains are not themselves registered with a netfilter hook.) This construct allows for greater organization and provides the framework necessary for more robust branching.

User-defined chains act as simple extensions of the chain which called them. For instance, in a user-defined chain, evaluation will pass back to the calling chain if the end of the rule list is reached or if a RETURN target is activated by a matching rule. Evaluation can also jump to additional user-defined chains.

§ 1.2.2.6 Connection Tracking

Connection tracking allows iptables to make decisions about packets viewed in the context of an ongoing connection. The connection tracking system provides iptables with the functionality it needs to perform "stateful" operations. Connection tracking is applied very soon after packets enter the networking stack 100. The raw table 158 chains and some basic sanity checks are the only logic that is performed on packets prior to associating the packets with a connection. The system checks each packet against a set of existing connections. It will update the state of the connection in its store if needed and will add new connections to the system when necessary. Packets that have been marked with the NOTRACK target in one of the raw chains will bypass the connection tracking routines. The connection states include (1) new, (2) established, (3) related, (4) invalid, (5) untracked, (6) SNAT, and (7) DNAT. The states tracked in the connection tracking system allow administrators to craft rules that target specific points in a connection's lifetime. This provides the functionality needed for more thorough and secure rules.

§ 1.2.2.7 Filter Rule Synchronization on Restart

FIG. 2 illustrates an example environment 200 in which example embodiments consistent with the present description may be used. A data forwarding device 210 (such as a router for example, and referred to generally as a "box") may be configured from a centralized cloud-based controller 205 and/or via a command line interface ("CLI") terminal 212. If a firewall is implemented on a box running on Linux, such a firewall may be implemented using iptables (e.g., filter table(s) 152) interfacing with the Linux kernel hooks 114, 116, 118 provided by the netfilter framework 110. As will be described below, one or more applications (e.g., configuration application 218 and/or firewall filter application 230) may be used to program the filter rules to the iptables in accordance with firewall CLI 212 configuration on the box 210.

For example, a configuration-side application 218 may be used to parse the firewall filter (also referred to as a "filter" representing a conceptual rule) configuration to create a filter object 222a/222b (referred to more generally as "filter information"), and publish the filter object(s) 222a/222b to a common object database 220 on the box 210. Thus, the configuration-side application 218 may be thought of as a "producer" of the filter objects 222a/222b.

Still referring to FIG. 2, the firewall filter application 230 will have subscribed for such a filter object(s) 222a/222b, and may therefore be thought of as a "consumer" of the filter object(s) 222a/222b. The firewall filter application 230 reads the filter object(s) 222a/222b and programs iptables 245 with the filter 247.

If, in such a scenario, the firewall filter application 230 restarts (e.g., due to a crash in the application, a manual restart, etc.), when it 230 comes online after the restart, it 230 will have iptables rules 245 already present in the Linux kernel 240 that were added before the firewall filter application 230 went down. Unfortunately, the filter object(s) may have changed during the restart. For example, a filter configuration 216 may have been changed, or the configuration application 218 may have crashed before it processed all the pending updates to the filter object(s) 222 in the database 220. Therefore, it is possible that the filter 216 configured on the box 210 and the filter 247 on the Linux kernel 240 are not in sync. To ensure synchronization of the filters 216 and 247, the firewall/filter application 230 could (1) remove ("flush") all the filter rules 247 programmed in the Linux kernel 240 when it 230 comes up and (2) re-program all the filter objects 222. Unfortunately, however, this requires too much time and would leave the system vulnerable until the filter rules 247 are re-applied.

To mitigate such vulnerability, it would be useful if the firewall filter application 230 would only touch those of the filter rules 247 in the Linux kernel 240 which have required changes that occurred during restart. A technique that can do this effectively (with reduced risk of synchronization errors), efficiently and with minimal use of extra resources would be useful.

§ 1.2.2.7.1 Known Filter Rule Synchronization Techniques and their Perceived Limitations An application (e.g., the firewall/filter application 230) could use "markers" on the database 220 to mark objects (e.g., filter objects 222) that have been read, processed and acknowledged. For example, markers can be used to mark the last filter object 222 added to the object database 220. Unfortunately, however, this potential solution requires additional data for the markers. Further, this potential solution may require synchronization information to be stored in different places, which can lead to synchronization errors.

Another possible solution is for the firewall/filter application 230 to maintain data for filters it installed and syncing the data to a persistent memory location (e.g., on the box 210, or outside the box 210, such as a high availability HA repository). Then, after the restart, the application can read all application data, check for any difference between the old data and new filter objects (last saved/programmed filter and the one read from the database) and update/reprogram the filter, if there is a change. Unfortunately, however, this potential solution also requires additional data; namely, all the filter data of installed filters. Further, syncing such data can take time and resources and is prone to sync issues and/or failures.

Furthermore, for boxes 210 in cloud, where this persistent memory may be running on another node, there are always the risks of when syncing (e.g., due to connectivity issues, or sync not getting finished completely before the application restarts). This can cause the filter rules 247 on Linux kernel 240 to be out of sync with those filters 216 is configured.

As should be appreciated from the foregoing, it would be very useful to mitigate filter rule synching vulnerabilities after restart of a firewall filter application. It would be very useful if such to minimize synching vulnerabilities in a manner that is effective and efficient (e.g., in terms of extra resources).

§ 2. SUMMARY OF THE INVENTION

Filter synchronization across a restart of a firewall filter application for converting filter information for filters into corresponding iptables filter table rules, is ensured by (1) computing a hash value for filter information derived from a filter using the filter or information derived from the filter, (2) determining an iptables filter table rule using the filter information for the filter, (3) associating the hash value with the corresponding iptables filter table rule, and (4) adding the determined iptables filter table rule and the hash value to iptables filter table rules in a Linux kernel. When a restart of the firewall filter application is detected, (1) a current instance of filter information derived from a current instance of the filter is obtained, (2) a hash value for the current instance of filter information is computed using the current instance of the filter or information derived from the current instance of the filter, (3) the hash value for the filter information is obtained from the iptables rules, and (4) whether the hash value for the current instance of the filter information is the same as the hash value for the filter information is determined. If it is determined that the hash value for the current instance of the filter information is not the same as the hash value for the filter information, then (1) a new iptables rule for the current instance of the filter information is determined, and (2) the iptables filter rule and the hash value in the iptables rules is replaced with the new iptables rule and the hash value for the current instance of the filter information.

§ 3. BRIEF DESCRIPTION OF THE DRAWINGS

FIGS. 6A-6D illustrate operations of alternative example methods consistent with the present description.

FIGS. 10A and 10B illustrate example packet forwarding operations of the example distributed ASICs of FIG. 9.

§ 4. DETAILED DESCRIPTION

Figure 1:
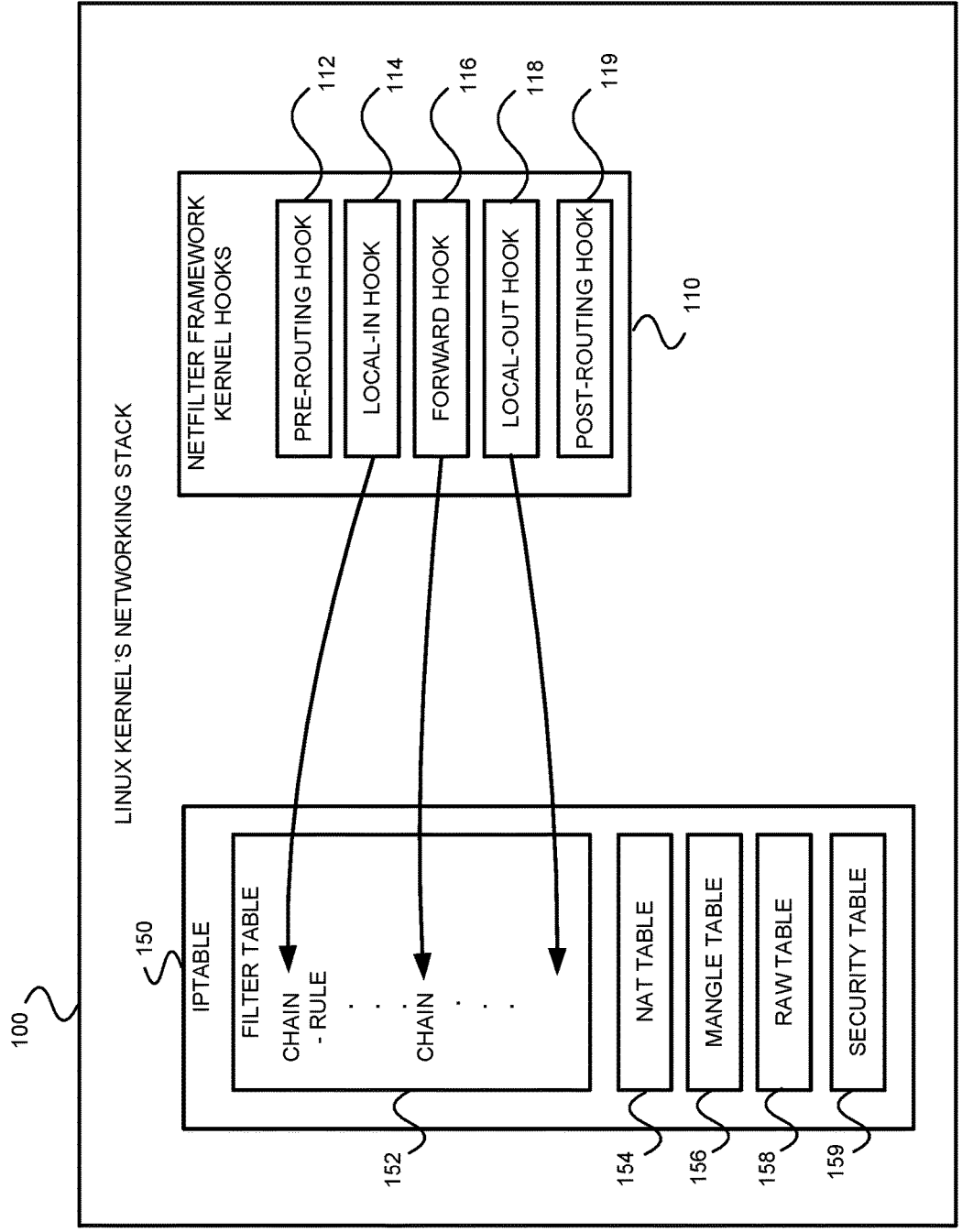
FIG. 1 illustrates the use of iptables with hooks of the netfilter framework kernel hooks.

The present description may involve novel methods, apparatus, message formats, and/or data structures for ensuring synchronization of filter rules over restart of a data forwarding device, such as restart of a Linux kernel and/or the restart of a firewall filter application used by the data forwarding device. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. No element, act or instruction used in the description should be construed as critical or essential to the present invention unless explicitly described as such. Also, as used herein, the article "a" is intended to include one or more items. Where only one item is intended, the term "one" or similar language is used. Thus, the present invention is not intended to be limited to the embodiments shown and the inventors regard their invention as any patentable subject matter described.

§ 4.1 Example Methods

The present description includes actions performed before a restart of a firewall/filter application (for converting filter information, such as filter objects, into iptables filter table rules) 230, and actions performed after the restart of the firewall/filter application 230. Before restart, hashes for filter contents (all of the terms, with match conditions and actions) are computed. The hash is stored, along with the filter, in the Linux kernel 240, when programming from the firewall/filter application 230. After restart of the firewall filter application 230, a hash of a filter object 222 is checked against the stored hash of the filter. If the hash values are the same, the filter rule or filter chain (whichever had been hashed earlier) has not changed across the restart. If, however, the hash values are not the same, the filter rule or filter chain has changed. If the filter rule or filter chain has changed, the filter rule or filter chain stored in the filters table 152 is updated, the updated filter is hashed, and both the updated filter and its hash are stored in the Linux kernel (e.g., in iptables) 245.

An example pre-restart filter configuration method 400 consistent with the present description is described in § 4.1.1, with reference to FIG. 4, below. Then, an example post-restart filter information (e.g., filter object) synchronization (check) method consistent with the present description is described in § 4.1.2, with reference to FIG. 5, below. First, however, certain terminology is discussed with reference to FIG. 3.

Figure 3:
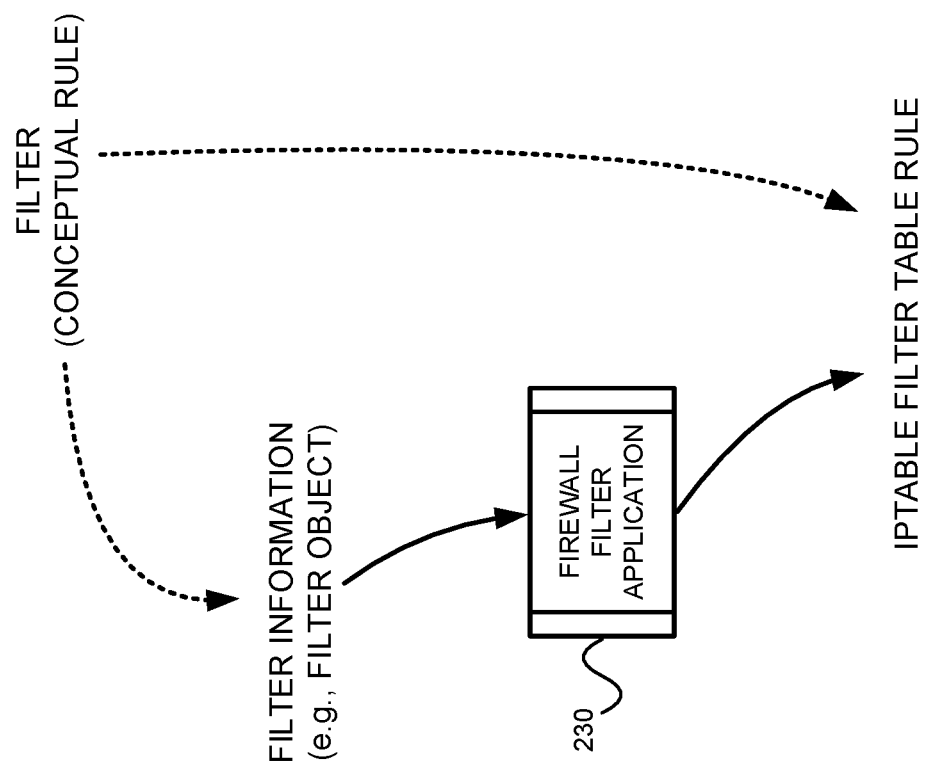
FIG. 3 illustrates terminology that may be used in the present description and claims.

As shown in FIG. 3, a filter conceptual rule (that is, without regard to specific syntax or format) is simply referred to as a "filter." The "filter" may be expressed as "filter information" (e.g., a filter object 222). When "filter information" is processed by a firewall filter application 130, a "iptables filter table" 152 "rule" is generated. Note that in some cases, a filter may be represented by more than one rule provided in a user-defined chain. As shown, the "iptables filter table rule" is an expression of the conceptual "filter."

§ 4.1.1 Pre-Restart Filter Configuration

Figure 2:
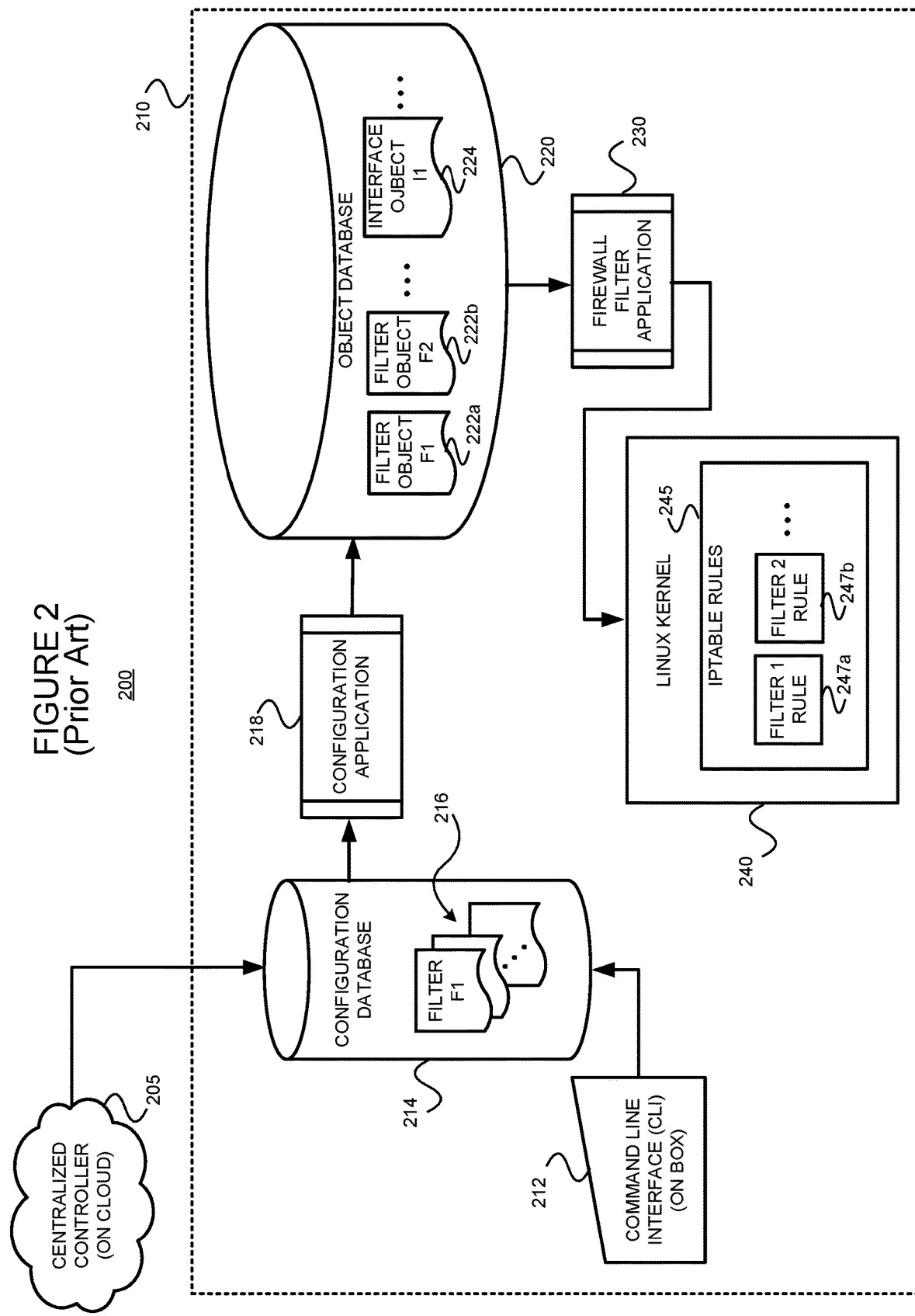
FIG. 2 illustrates and environment in which the present description can be used.
Figure 4:
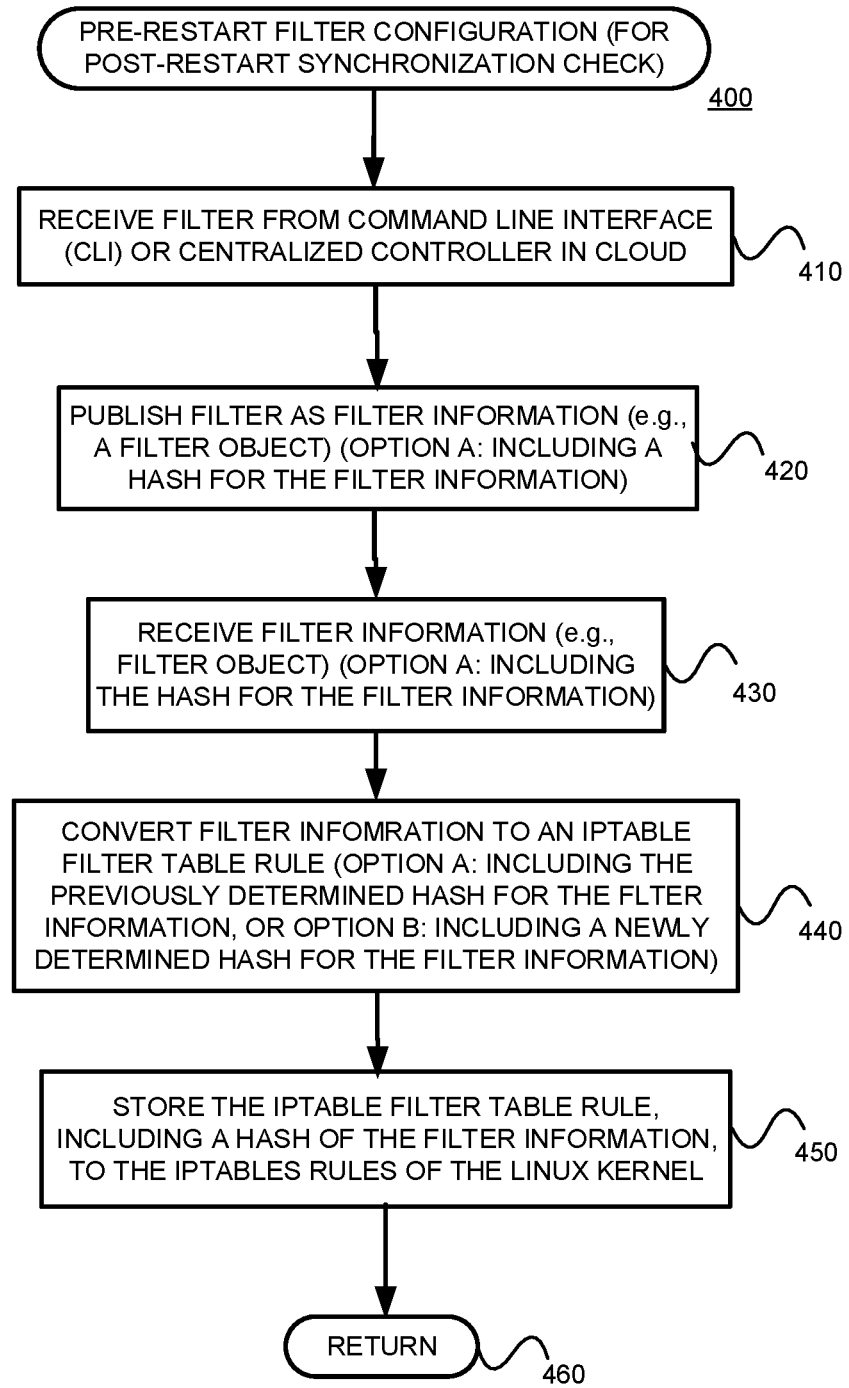
FIG. 4 is a flow diagram illustrating an example pre-restart filter configuration method consistent with the present description.

FIG. 4 is a flow diagram illustrating an example pre-restart filter configuration method 400 consistent with the present description. A filter is received, for example, from a command line interface (Recall, e.g., 212 of FIG. 2.) or from a centralized controller (e.g., on the cloud) (Recall, e.g., 205 of FIG. 2.). (Block 410) The filter rule is then published as filter information (e.g., a filter object). (Block 420) This may be performed, for example, by the configuration application 218 of FIG. 2. The filter information (e.g., a filter object) is then received and converted to an iptables filter table rule. (Blocks 430 and 440) Referring back to "option A" in blocks 420-440, the filter information may be hashed, and the hash of the filter information may be provided with (e.g., within) the filter information. Alternatively, referred back to "option B" in block 440, the filter information may be hashed, and the hash of the filter information may be provided with (e.g., within) the iptables filter table rule. Finally, the iptables filter table rule, including the hash of the filter information, is stored in the iptables rules of the Linux kernel (Block 450) before the method 400 is left (via Node 560). Referring back to FIG. 3, the filter information (e.g., a filter object) may be hashed directly. Alternatively, the filter information may be hashed indirectly, for example by hashing an iptables filter table rule derived from the filter information (e.g., from the filter object). Generally, a hash value for the filter (e.g., for the filter information corresponding to the filter) is determined.

Although the example method 400 illustrated computing a hash of the filter information (e.g., filter object), there are other embodiments corresponding to what information is hashed (e.g., the filter, the filter information, or the Iptable filter rule) and which application performs the hashing (e.g., the configuration application 218, or the firewall filter application 230). FIGS. 6A-6D illustrate four (4) alternative embodiments. In FIGS. 6A-6D, a filter is denoted as F (perhaps followed by a number), a hash of the filter is denoted as F* (perhaps with an intervening number), filter information is denoted as FI (perhaps followed by a number), a hash of the filter information is denoted as FI* (perhaps with an intervening number), an Iptable filter rule is denoted as IPTFR (perhaps followed by a number), and a hash of the Iptable filter rule is denoted as IPTFR* (perhaps with an intervening number).

FIG. 6A depicts an example embodiment in which a filter 216 is hashed by a filter hashing module 619 in the configuration application 618. This is depicted with a dot-dash arrow. In this example, the respective hashes of filters F1 and F2 are denoted as F1* and F2*, and are provided in (or with) the filter objects FI1 622a and FI2 622b, respectively. The hashes F1* and F2* are also provided in (or with) the Iptable filter rules 647a and 647b, respectively. Thus, when a filter is added (e.g., from a CLI user-interface 212), when the configuration application 618, that parses the configuration, is creating a filter object and publishes it to the database, it may also compute a hash for the filter contents and add it to the filter object 622 as shown in FIG. 6A.

Figure 6B:
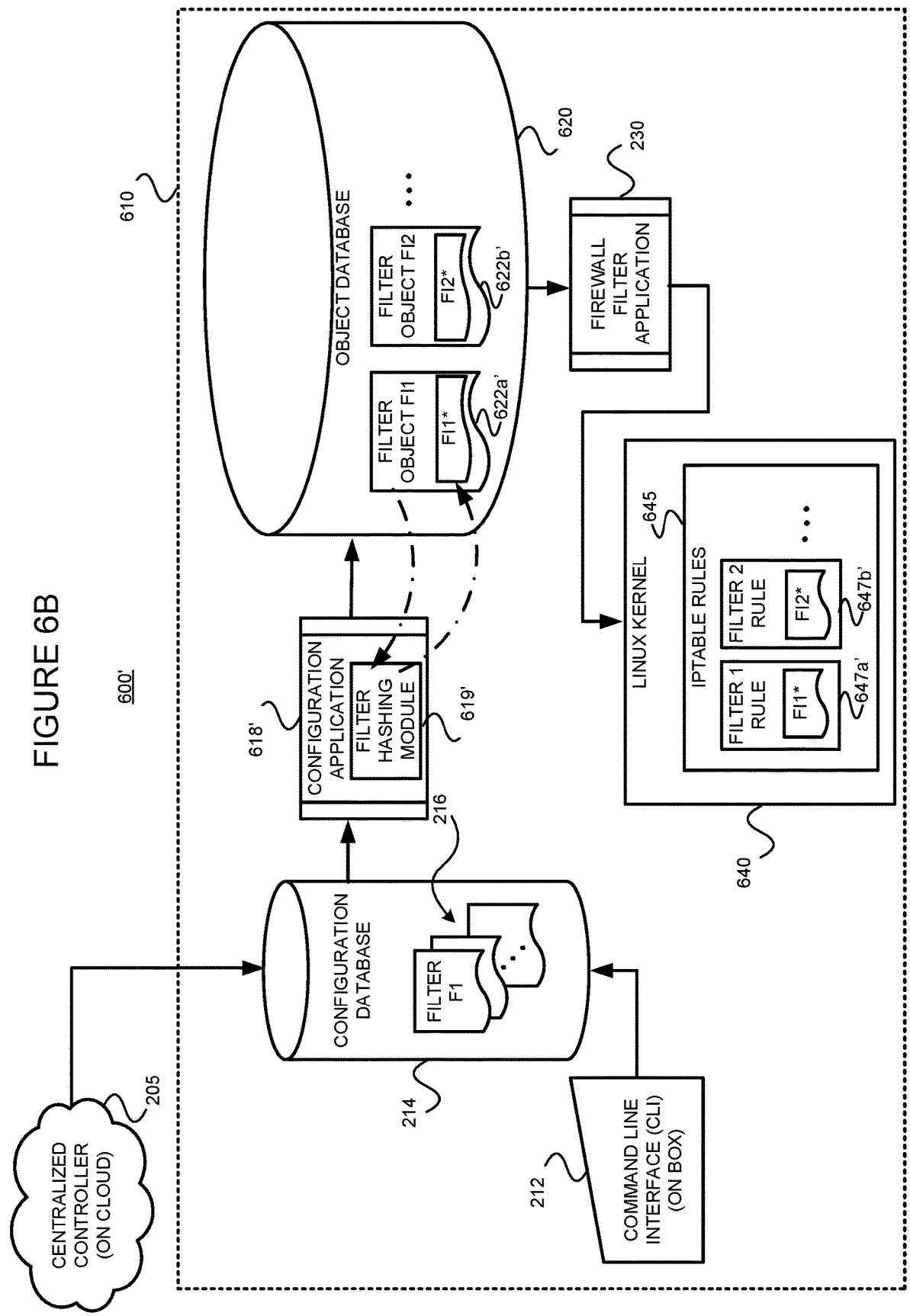

Referring next to FIG. 6B, a filter hashing module 619' in the configuration application 618' may be used to hash previously generated filter information FI1 and FI2 stored in the object database 620. This is depicted by the dot-dash arrows. As shown, the resulting hashes FI1* and FI2* are stored in (or with) their respective filter objects 622a' and 622b'. The resulting hashes FI1* and FI2* are also provided in (or with) their respective IP Table filter rules 647a' and 647b'.

Figure 6C:
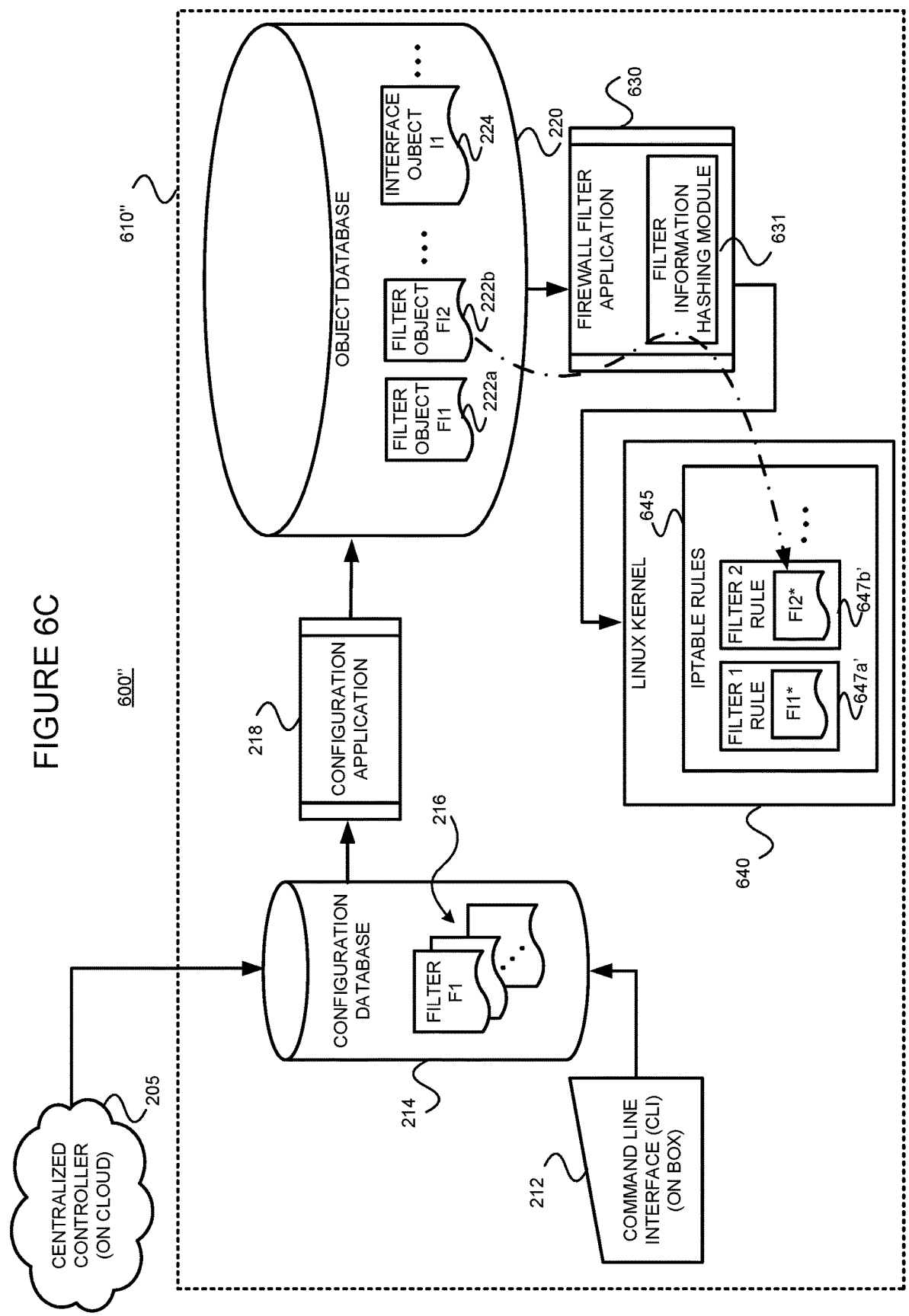

Referring next to FIG. 6C, a filter information hashing module 631 in the firewall filter application 630 may be used to hash filter information FI1 and FI2 222 stored in the object database 220. The hashing of the filter information FI2 is depicted by the dot-dash arrow. As shown, the resulting hashes FI1* and FI2* are stored in (or with) their respective Iptable filter rules 647a' and 647b'. Thus, when a filter is added (e.g., from a CLI user-interface 212), when the firewall/filter application 630 consumes the filter object 222, it computes the hash for the filter object 222 and adds the hash value to it before storing the resulting Iptables filter table rule 647' as shown.

Figure 6D:
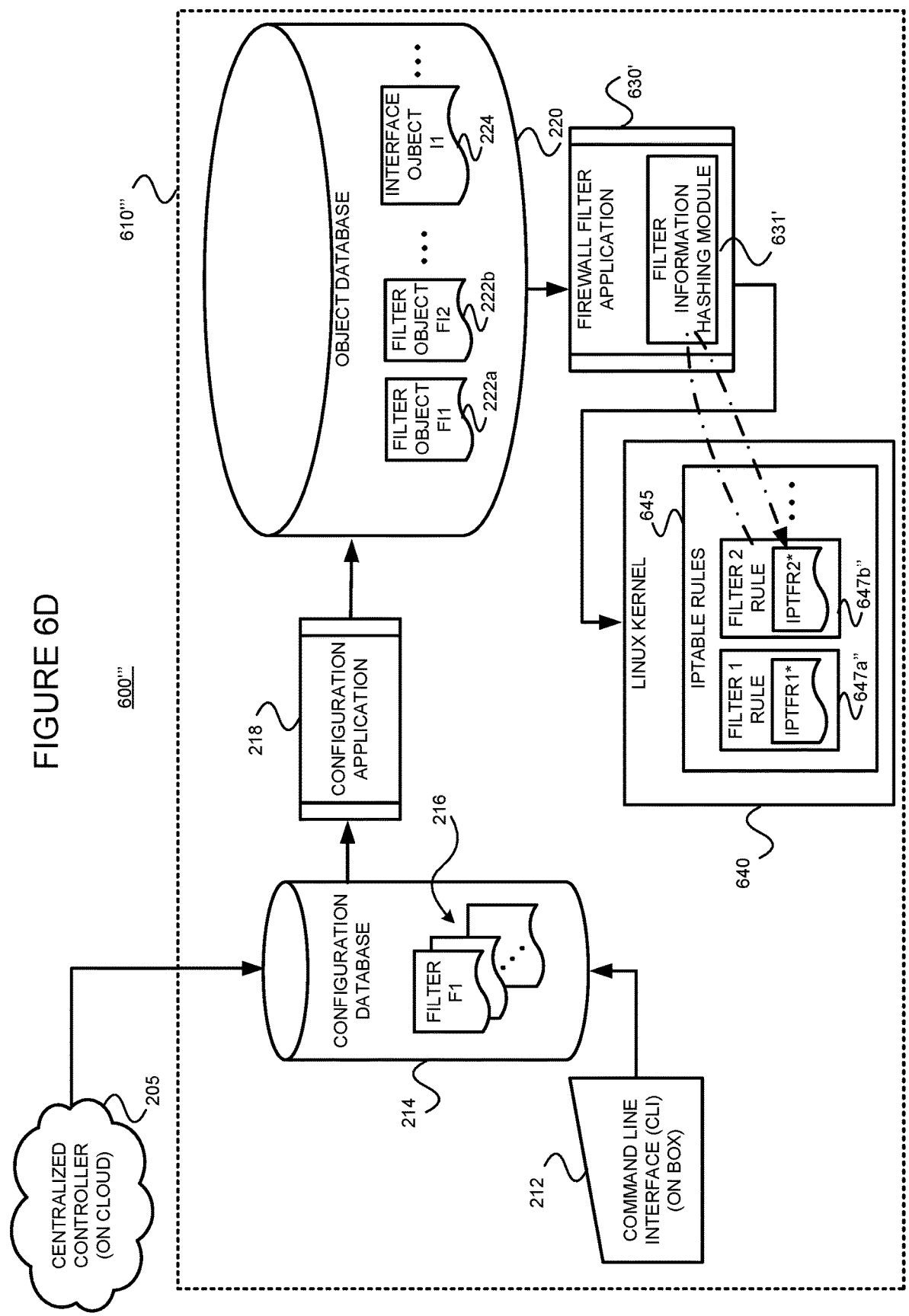

Finally, referring to FIG. 6D, a filter information hashing module 631' in the firewall filter application 630' may be used to hash Iptable filter rules. The hashing of the Iptable filter rules IPTFR1 and IPTFR2 are depicted by the dot-dash arrow. As shown, the resulting hashes IPTFR1* and IPTFR2* are stored in (or with) their respective Iptable filter rules 647a" and 647b".

In any of the foregoing alternative implementations, whether or not filter information (e.g., a filter object) corresponding to a filter rule has changed can be determined using the hash value. In any of the foregoing alternative implementations, while programming the filter object 222 to the Linux kernel 240, the firewall/filter application 230 will take note of the hash value (F*, FI*, or IPTFR*) and add it to the filter rule in iptables 645. Any of these alternative implementations can be said to create a hash value "for" the filter or "for" filter information, without loss of generality. That is, a hash value "for" a filter or "for" filter information may be a hash "of" the filter, or a hash "of" information derived from the filter (e.g., a hash value of filter information such as a filter object derived from the filter, a have value of an Iptables filter rule derived from the filter, etc.)

Having described what may be hashed, and what application may perform the hashing, alternatives describing where and how the resulting hash is stored are now described. The resulting hash may be stored (A) within an IP Table filter rule (e.g., as a comment), (B) in association with the IP Table filter rule, or (C) within a new rule (e.g., as a comment) at the end of a user defined IP Table filter chain. Each of these options is now described.

Referring back to block 450 of FIG. 4, the hash value may be stored with, or in, the iptables filter table rule as follows. Iptables has an option to tag a rule using below with a comment:
   Reference:   http://ipset.netfilter.org/iptables-extensions-.man.html
   comment
   Allows you to add comments (up to 256 characters) to any rule.
   -comment comment Example iptables -A INPUT -i eth1 -m comment --comment "my local LAN"
   A filter object for a filter is a filter with all its content stored in the system database. It could be in the data definition language (DDL) or a domain-specific language (DSL) representation of filter object, or any other representation used to store the objects in a database on systems). Thus, a filter object can be thought of as a representation of a filter in database.

A filter can be very trivial. For example, a filter might have just one rule (including a match condition(s) and an action(s)). Alternatively, a filter could have a more hierarchal implementation which can include multiple filter terms, each of which filter terms has a rule (including a match condition(s) and an action(s)). For example, a simple filter could look like:
   simple-filter
   from {
   source-address {→match 1 on src address
   20.1.1.1/32;
   } protocol pim; →match 2 on pim protocol (could also have additional matches)
}
then {
discard; →action is to discard such packets
}
}
}

The filter can be applied on the ingress side of a data forwarding device (e.g., a router), and can apply either to all interfaces, or to one or more specific interfaces.

The following iptables rule can be used to add this filter:
Iptables -A INPUT -s 20.1.1.1/32 -p pim -m comment --comment F-simple-filter_H-f8b3198510eb9b1de1a467d659230862 -j DROP (note we have missing interface option, so it is applied on all interfaces on input and the comment has hash for the rule/filter content).

This is how the iptables filter rule looks in iptables output:
root@EVOvPTX1_RE0-re0:~# iptables -vL
Chain INPUT (policy ACCEPT 137 packets, 16591 bytes)→Input DEFAULT chain pkts bytes target prot opt in out source destination 0 0 DROP pim -- any any 20.1.1.1 anywhere /* F-simple-filter_H-M3198510eb9b1de1a467d659230862*/→the rule with hash in comment.

One good way to implement filters with multiple rules (terms) in iptables is to use a user-defined chain and add all term rules under it. An example of a filter with multiple terms, each having a rule with match condition(s) and action(s).

Filter filter-test
  term icmp-term {→term 1 will correspond to rule 1
    from {
      protocol icmp;
    }
    then {
      discard;
    }
  }
  term tcp-syn-term {→term 2 will correspond to rule 2
    from {
      protocol tcp;
      tcp-flags syn;
    }
    then {
      discard;
    }

Two rules could be added directly to a local-IN chain as a simple filter. However, user-defined chains may provide a better representation for such filters. Such a user-defined chain may be:
Iptables -N filter-test→we add a user defined chain for the filter
Iptables -A filter-test -p icmp -m comment --comment F-filter-test_T-icmp-term -j DROP→we add rule 1 for term 1 to it
Iptables -A filter-test -p tcp -m tcp --tcp-flags SYN SYN -m comment --comment F-filter-test_T-tcp-syn-term -j DROP→we add rule 2 for term 2 to it
Iptables -A filter-test -m comment --comment F-filter-test_H-f8b3198510eb9b1de1a467d659230881→we add a dummy rule which has no action at end of the chain with hash. A hash could be added to individual rules too.

Finally, the user-defined chain is hooked to (and triggered by) an input stream, and consequently is applied on the input (e.g., ingress) side of a data forwarding device. To reiterate, if one specifies (-I interface, it will get applied on particular interfaces).

Iptables -A INPUT -j filter-test
Iptables looks like:
Chain INPUT (policy ACCEPT 444 packets, 29715 bytes)
pkts bytes target prot opt in out source destination
11287 903K filter-test all -- any any anywhere anywhere→target has filter-test chain so is plugged in
Chain FORWARD (policy ACCEPT 6 packets, 816 bytes)
pkts bytes target prot opt in out source destination
Chain OUTPUT (policy ACCEPT 433 packets, 28653 bytes)
pkts bytes target prot opt in out source destination
Chain filter-test (1 references)→user defined filter chain
pkts bytes target prot opt in out source destination
0 0 DROP icmp -- any any anywhere anywhere /* F-filter-test_T-icmp-term */→rule 1/term 1
7 420 DROP tcp -- any any anywhere anywhere tcp flags:SYN/SYN/*F-filter-test_T-tcp-syn-term */→rule 2/term 2
5180 417K all -- any any anywhere anywhere /* F-filter-test_H-f8b3198510eb9b1de1a467d659230881*/→ dummy rule with hash root@EVOvPTX1_RE0-re0:~#

Regarding how to obtain a hash value, md5 hash on Linux (using md5sum) may be used for hash computation of the filter contents. Alternatively, other (e.g., more sophisticated) hashing algorithms could be used instead. If md5 hash is used, the 128-bit hash value, which is 32 hex characters, will easily fit in the up to 256 character comment field.

§ 4.1.2 Post-Restart Filter Configuration Synchronization Check

Figure 5:
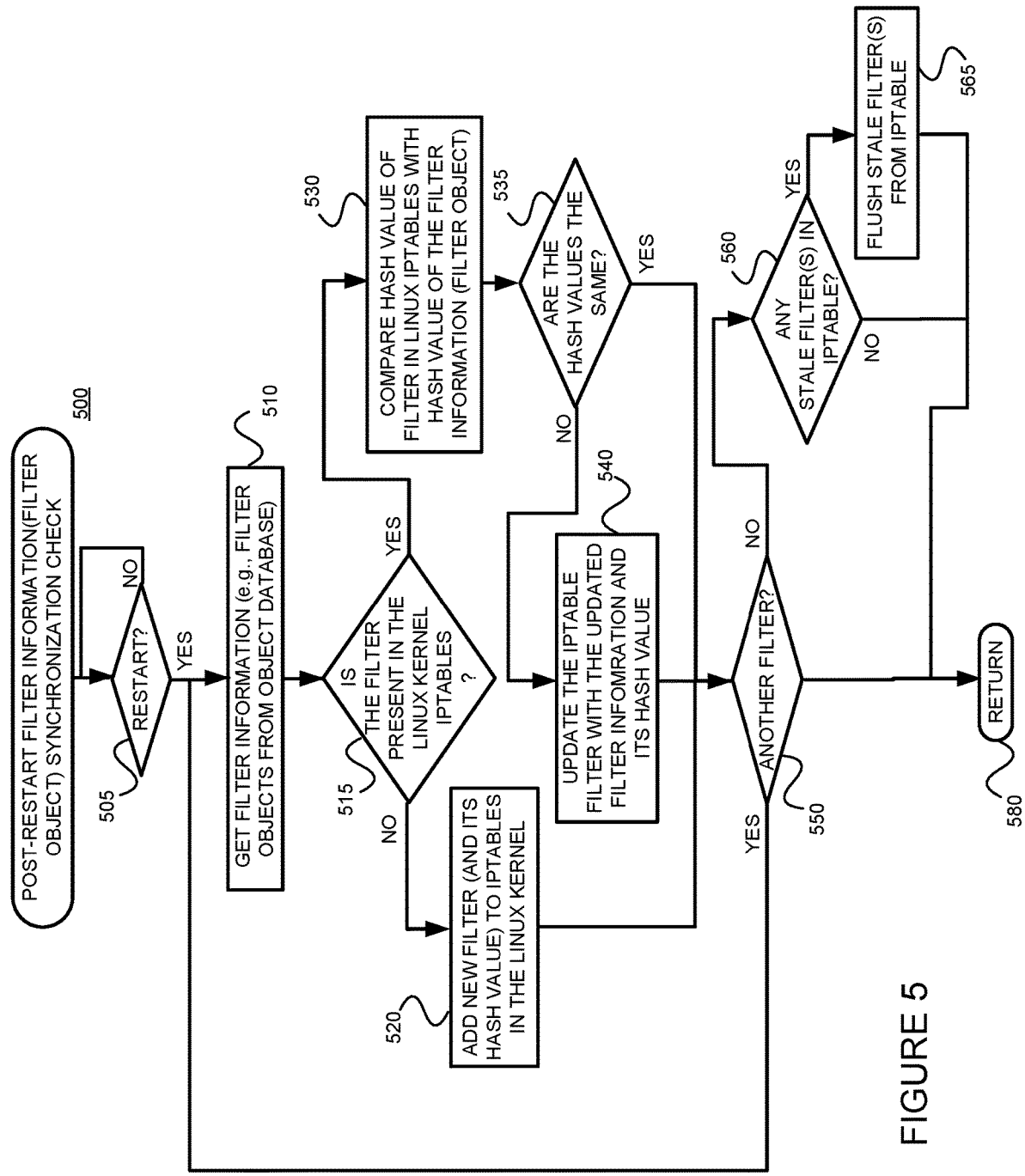
FIG. 5 is a flow diagram illustrating an example post-restart filter information (e.g., filter object) synchronization (check) method consistent with the present description.

FIG. 5 is a flow diagram illustrating an example post-restart filter information (e.g., filter object) synchronization (check) method 500 consistent with the present description. As shown, the example method 500 is run in the event of a restart (e.g., of the firewall/filter application 23). (Event 505) Responsive to the restart, filter information is obtained. For example, filter objects 222 may be read from object database 220. Next, it is determined whether or not the filter is already present in the Linux kernel iptables. (Decision 515) That is, it is determined whether the filter information corresponds to a brand new filter rule, or a previously saved filter rule. If the filter is not already present in the Linux kernel iptables (Decision 515, NO), the filter information of the new filter (and its hash value) are added to iptables in the Linux kernel (Block 520) and the method 500 continues to decision 550. Referring back to decision 515, if the filter is already present in the Linux kernel iptables (Decision 515, YES), a hash value of the filter information is compared with the hash value of the filter table rule stored in the iptables. If the hash values are the same (Decision 535, YES), the method 500 continues to decision 550. That is, since the filter information of the filter rule did not change over restart, nothing needs to be done. If, however, the hash values are not the same (Decision 535, NO), the method 500 updates the iptables filter rule (and its corresponding hash value) (Block 540) before the method 500 continues to decision 550.

At decision 550, it is determined if there is another filter rule to process. If so (Decision 550, YES), the method 500 branches back to block 510. Otherwise (Decision 550, NO), the method continues to decision 560. In decision 560, it is determined whether or not there are any stale filter rules in the iptables filter table. That is, it is determined whether or not a filter rule that existed before restart no longer exists after restart. If there are any stale filter rules in the iptables filter table (Decision 560, YES), such stale filter(s) is/are flushed from the iptables (Block 565) and the method 500 is left (Node 580). If, on the other hand, there are no stale filter rules in the iptables filter table (Decision 560, NO), the method 500 is left (Node 580) After the method 500 is completed, the stored filter information should be synchronized. At this time, new filters may be added, and/or existing filters may be altered and/or removed.

As should be appreciated from the foregoing, in the context of filter information as filter objects, on an application (e.g., firewall filter application 230) restart, when all the filter objects 222 from the database 220 are read by the application, it will check in the Linux kernel 240, to determine if it has filter present for it. (Recall decision 515.) If a filter is not found, the application will add the filter (and its corresponding hash value). (Recall block 520.) If, on the other hand, a filter is found, it will go fetch the hash and check it against the hash of filter object 222 received from the object database. (Recall 530 and 535.) If the hash values are same, the filter has not changed since the last application programmed the filter to iptables and it will leave it untouched. (Recall YES branch of decision 535.) If, on the other hand, the hash is different (i.e., the filter has changed), the application will re-program (i.e., update) the filter with the new contents. (Recall decision 535 NO and block 540.)

Please note that a hash value for filter terms could be added too, and then used to check if individual filter terms have changed for filter. This would avoid impacting filter terms which have not changed.

Finally, the application can record all the filters it receives after the restart. Then, after the application has stayed idle for some time (e.g., not processing any filter objects which could hint that it is done with all the filter objects), or after a configured time, it could delete from the Linux kernel any filter chains for which it did not get a filter object because such filters would be assumed to be stale after the application restart. (Recall decision 560, YES and 565.) Alternatively, before deleting any filters, the application could wait on a signal from the object database to hint that processing of all the filter objects in the system by application is complete.

§ 4.2 Example Apparatus

Figure 7:
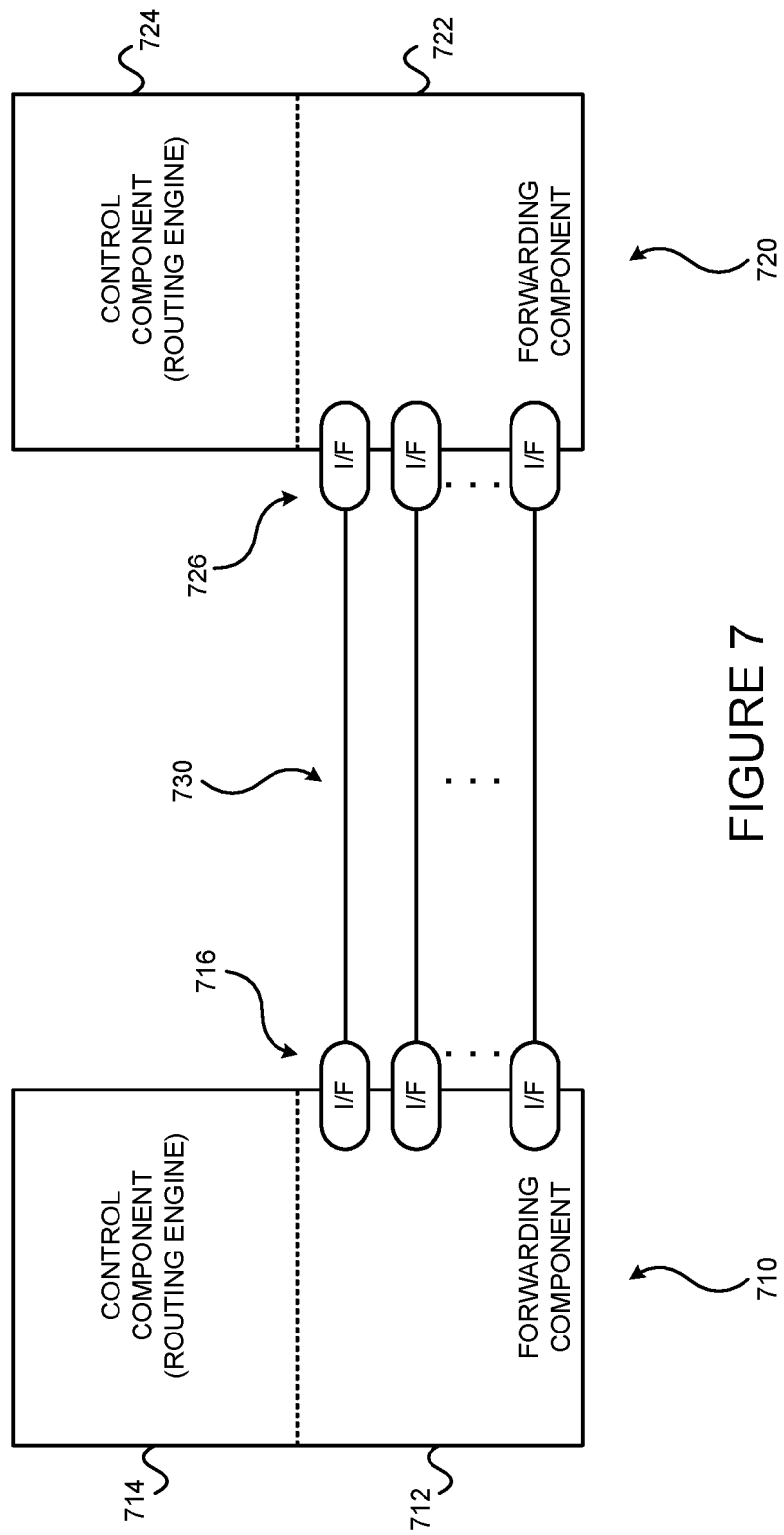
FIG. 7 illustrates an example environment including two systems coupled via communications links.

FIG. 7 illustrates two data forwarding systems 710 and 720 coupled via communications links 730. The links may be physical links or "wireless" links. The data forwarding systems 710,720 may be nodes, such as routers for example. If the data forwarding systems 710,720 are example routers, each may include a control component (e.g., a routing engine) 714,724 and a forwarding component 712,722. Each data forwarding system 710,720 includes one or more interfaces 716,726 that terminate one or more communications links 730. The example methods 400 and 500 described above may be implemented in the control component 714/724 of devices 710/720.

As just discussed above, and referring to FIG. 8, some example routers 800 include a control component (e.g., routing engine) 810 and a packet forwarding component (e.g., a packet forwarding engine) 890.

The control component 810 may include an operating system (OS) kernel 820, routing protocol process(es) 830, label-based forwarding protocol process(es) 840, interface process(es) 850, user interface (e.g., command line interface) process(es) 860, and chassis process(es) 870, and may store routing table(s) 839, label forwarding information 845, and forwarding (e.g., route-based and/or label-based) table(s) 880. As shown, the routing protocol process(es) 830 may support routing protocols such as the routing information protocol ("RIP") 831, the intermediate system-to-intermediate system protocol ("IS-IS") 832, the open shortest path first protocol ("OSPF") 833, the enhanced interior gateway routing protocol ("EIGRP") 834 and the border gateway protocol ("BGP") 835, and the label-based forwarding protocol process(es) 840 may support protocols such as BGP 835, the label distribution protocol ("LDP") 836 and the resource reservation protocol ("RSVP") 837. One or more components (not shown) may permit a user 865 to interact with the user interface process(es) 860. Similarly, one or more components (not shown) may permit an outside device to interact with one or more of the router protocol process(es) 830, the label-based forwarding protocol process(es) 840, the interface process(es) 850, and the chassis process(es) 870, via SNMP 885, and such processes may send information to an outside device via SNMP 885.

The packet forwarding component 890 may include a microkernel 892, interface process(es) 893, distributed ASICs 894, chassis process(es) 895 and forwarding (e.g., route-based and/or label-based) table(s) 896.

Figure 8:
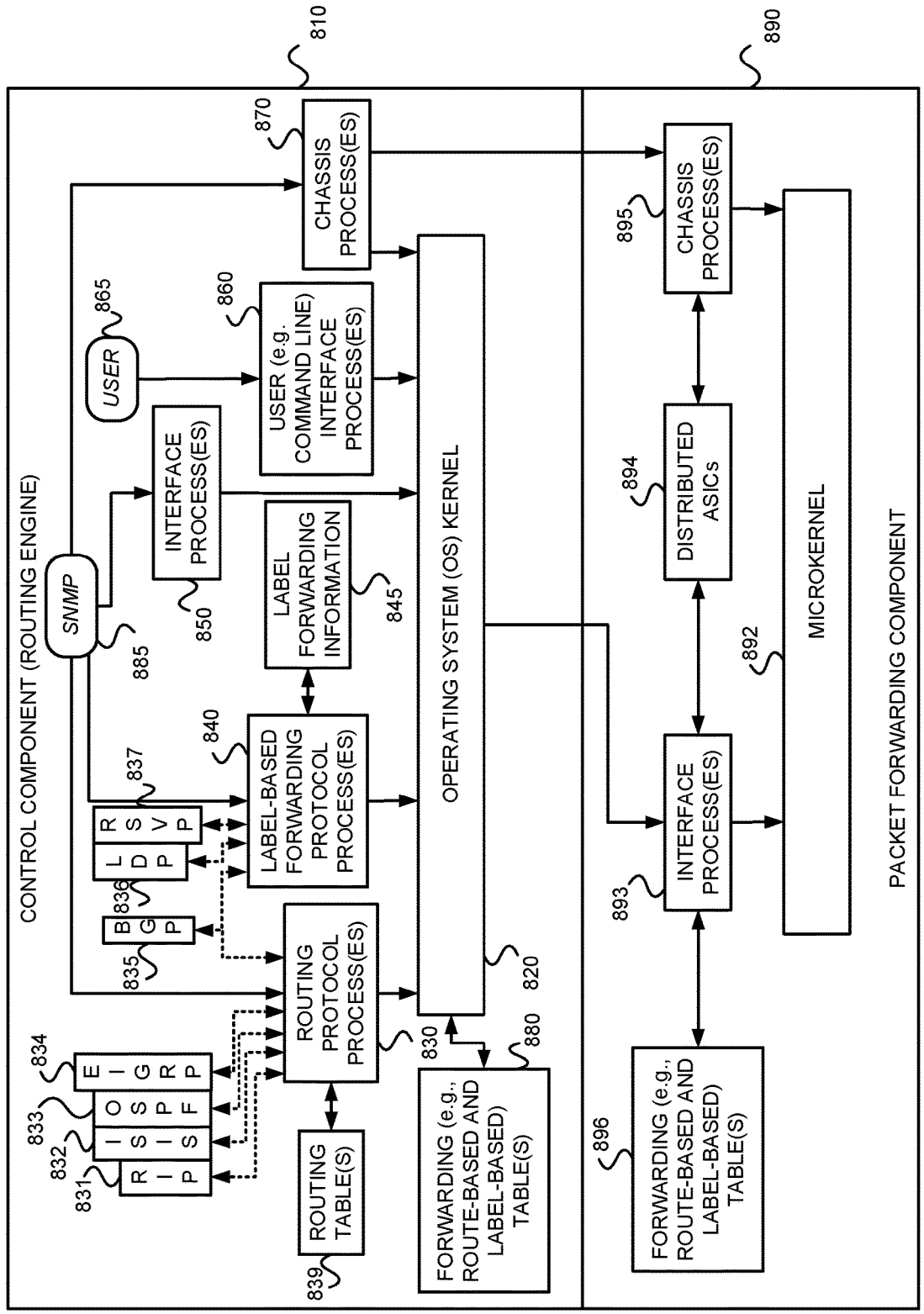
FIG. 8 is a block diagram of an example router on which the example methods of the present description may be implemented.

In the example router 800 of FIG. 8, the control component 810 handles tasks such as performing routing protocols, performing label-based forwarding protocols, control packet processing, etc., which frees the packet forwarding component 890 to forward received packets quickly. That is, received control packets (e.g., routing protocol packets and/or label-based forwarding protocol packets) are not fully processed on the packet forwarding component 890 itself, but are passed to the control component 810, thereby reducing the amount of work that the packet forwarding component 890 has to do and freeing it to process packets to be forwarded efficiently. Thus, the control component 810 is primarily responsible for running routing protocols and/or label-based forwarding protocols, maintaining the routing tables and/or label forwarding information, sending forwarding table updates to the packet forwarding component 890, and performing system management. The example control component 810 may handle routing protocol packets, provide a management interface, provide configuration management, perform accounting, and provide alarms. The processes 830, 840, 850, 860 and 870 may be modular, and may interact with the OS kernel 820. That is, nearly all of the processes communicate directly with the OS kernel 820. Using modular software that cleanly separates processes from each other isolates problems of a given process so that such problems do not impact other processes that may be running. Additionally, using modular software facilitates easier scaling.

Still referring to FIG. 8, the example OS kernel 820 may incorporate an application programming interface ("API") system for external program calls and scripting capabilities. The control component 810 may be based on an Intel PCI platform running the OS from flash memory, with an alternate copy stored on the router's hard disk. The OS kernel 820 is layered on the Intel PCI platform and establishes communication between the Intel PCI platform and processes of the control component 810. The OS kernel 820 also ensures that the forwarding tables 896 in use by the packet forwarding component 890 are in sync with those 880 in the control component 810. Thus, in addition to providing the underlying infrastructure to control component 810 software processes, the OS kernel 820 also provides a link between the control component 810 and the packet forwarding component 890.

Referring to the routing protocol process(es) 830 of FIG. 8, this process(es) 830 provides routing and routing control functions within the platform. In this example, the RIP 831, ISIS 832, OSPF 833 and EIGRP 834 (and BGP 835) protocols are provided. Naturally, other routing protocols may be provided in addition, or alternatively. Similarly, the label-based forwarding protocol process(es) 840 provides label forwarding and label control functions. In this example, the LDP 836 and RSVP 837 (and BGP 835) protocols are provided. Naturally, other label-based forwarding protocols (e.g., MPLS) may be provided in addition, or alternatively. In the example router 800, the routing table(s) 839 is produced by the routing protocol process(es) 830, while the label forwarding information 845 is produced by the label-based forwarding protocol process(es) 840.

Still referring to FIG. 8, the interface process(es) 850 performs configuration of the physical interfaces (Recall, e.g., 716 and 726 of FIG. 7.) and encapsulation.

The example control component 810 may provide several ways to manage the router. For example, it 810 may provide a user interface process(es) 860 which allows a system operator 865 to interact with the system through configuration, modifications, and monitoring. The SNMP 885 allows SNMP-capable systems to communicate with the router platform. This also allows the platform to provide necessary SNMP information to external agents. For example, the SNMP 885 may permit management of the system from a network management station running software, such as Hewlett-Packard's Network Node Manager ("HP-NNM"), through a framework, such as Hewlett-Packard's OpenView. Accounting of packets (generally referred to as traffic statistics) may be performed by the control component 810, thereby avoiding slowing traffic forwarding by the packet forwarding component 890.

Although not shown, the example router 800 may provide for out-of-band management, RS-232 DB9 ports for serial console and remote management access, and tertiary storage using a removable PC card. Further, although not shown, a craft interface positioned on the front of the chassis provides an external view into the internal workings of the router. It can be used as a troubleshooting tool, a monitoring tool, or both. The craft interface may include LED indicators, alarm indicators, control component ports, and/or a display screen. Finally, the craft interface may provide interaction with a command line interface ("CLI") 860 via a console port, an auxiliary port, and/or a management Ethernet port The packet forwarding component 890 is responsible for properly outputting received packets as quickly as possible. If there is no entry in the forwarding table for a given destination or a given label and the packet forwarding component 890 cannot perform forwarding by itself, it 890 may send the packets bound for that unknown destination off to the control component 810 for processing. The example packet forwarding component 890 is designed to perform Layer 2 and Layer 3 switching, route lookups, and rapid packet forwarding.

As shown in FIG. 8, the example packet forwarding component 890 has an embedded microkernel 892, interface process(es) 893, distributed ASICs 894, and chassis process(es) 895, and stores a forwarding (e.g., route-based and/or label-based) table(s) 896. (Recall, e.g., the tables in FIGS. 7A-7D.) The microkernel 892 interacts with the interface process(es) 893 and the chassis process(es) 895 to monitor and control these functions. The interface process(es) 892 has direct communication with the OS kernel 820 of the control component 810. This communication includes forwarding exception packets and control packets to the control component 810, receiving packets to be forwarded, receiving forwarding table updates, providing information about the health of the packet forwarding component 890 to the control component 810, and permitting configuration of the interfaces from the user interface (e.g., CLI) process(es) 860 of the control component 810. The stored forwarding table(s) 896 is static until a new one is received from the control component 810. The interface process(es) 893 uses the forwarding table(s) 896 to look up next-hop information. The interface process(es) 893 also has direct communication with the distributed ASICs 894. Finally, the chassis process(es) 895 may communicate directly with the microkernel 892 and with the distributed ASICs 894.

In the example router 800, the example methods 400 and 500 consistent with the present disclosure may be implemented in the packet forwarding component 890, and perhaps partly in the user CLI processes 860, or remotely (e.g., on the cloud). Generally, the example methods 400 and 500 can be implemented at any processing unit running Linux (and having Netfilter capabilities).

Figure 9:
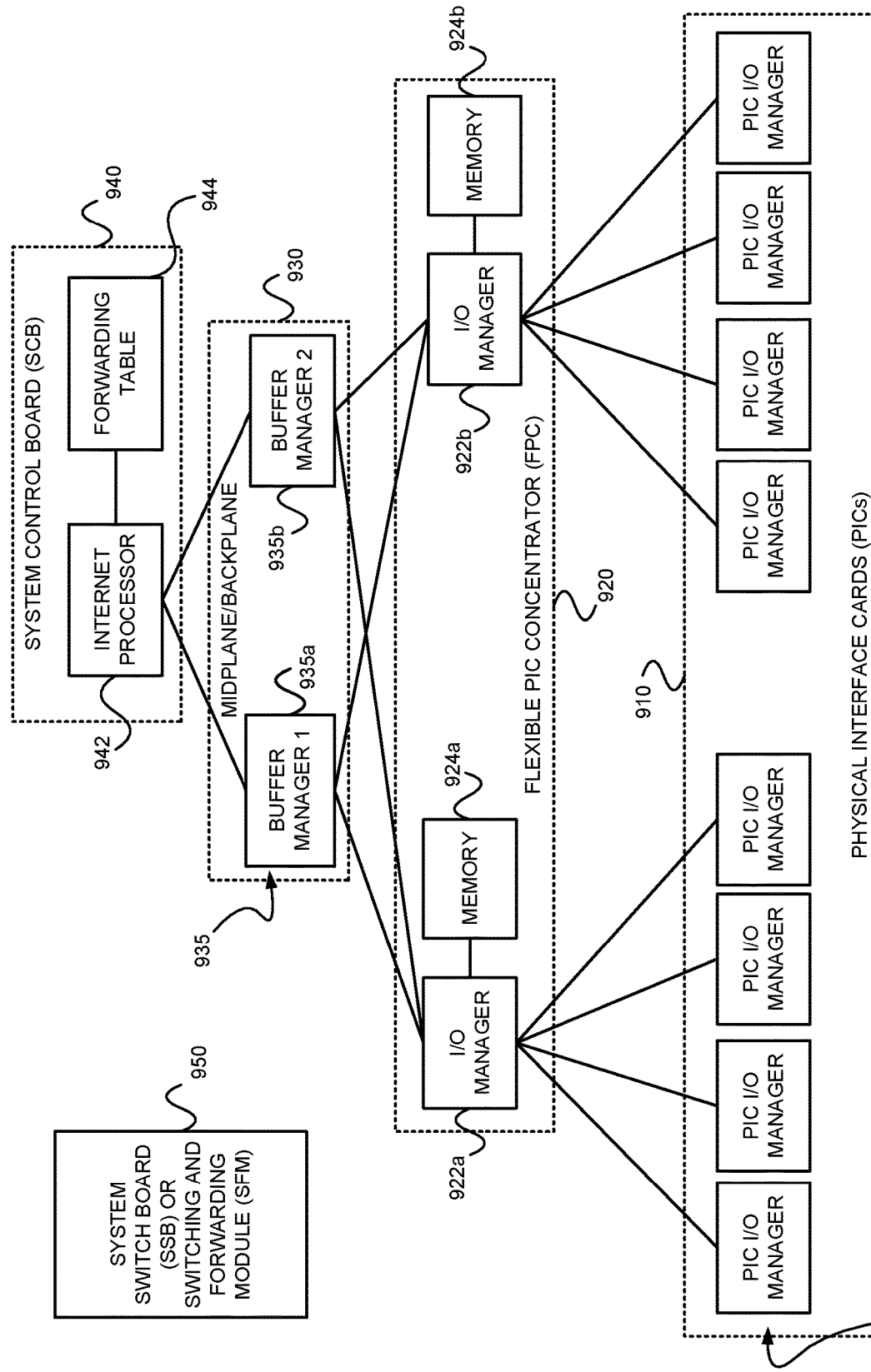
FIG. 9 is a block diagram of example distributed application specific integrated circuits ("ASICs") that may be provided in the example router of FIG. 9.

Referring back to distributed ASICs 894 of FIG. 8, FIG. 9 is an example of how the ASICS may be distributed in the packet forwarding component 890 to divide the responsibility of packet forwarding. As shown in FIG. 9, the ASICs of the packet forwarding component 890 may be distributed on physical interface cards ("PICs") 910, flexible PIC concentrators ("FPCs") 920, a midplane or backplane 930, and a system control board(s) 940 (for switching and/or forwarding). Switching fabric is also shown as a system switch board ("SSB"), or a switching and forwarding module ("SFM") 950. Each of the PICs 910 includes one or more PIC I/O managers 915. Each of the FPCs 920 includes one or more I/O managers 922, each with an associated memory 924. The midplane/backplane 930 includes buffer managers 935a, 935b. Finally, the system control board 940 includes an internet processor 942 and an instance of the forwarding table 944 (Recall, e.g., 896 of FIG. 8).

Still referring to FIG. 9, the PICs 910 contain the interface ports. Each PIC 910 may be plugged into an FPC 920. Each individual PIC 910 may contain an ASIC that handles media-specific functions, such as framing or encapsulation. Some example PICs 910 provide SDH/SONET, ATM, Gigabit Ethernet, Fast Ethernet, and/or DS3/E3 interface ports.

An FPC 920 can contain from one or more PICs 910, and may carry the signals from the PICs 910 to the midplane/backplane 930 as shown in FIG. 9.

The midplane/backplane 930 holds the line cards. The line cards may connect into the midplane/backplane 930 when inserted into the example router's chassis from the front. The control component (e.g., routing engine) 810 may plug into the rear of the midplane/backplane 930 from the rear of the chassis. The midplane/backplane 930 may carry electrical (or optical) signals and power to each line card and to the control component 810.

The system control board 940 may perform forwarding lookup. It 940 may also communicate errors to the routing engine. Further, it 940 may also monitor the condition of the router based on information it receives from sensors. If an abnormal condition is detected, the system control board 940 may immediately notify the control component 810.

Referring to FIGS. 9, 10A and 10B, in some exemplary routers, each of the PICs 910,810' contains at least one I/O manager ASIC 915 responsible for media-specific tasks, such as encapsulation. The packets pass through these I/O ASICs on their way into and out of the router. The I/O manager ASIC 915 on the PIC 910,810' is responsible for managing the connection to the I/O manager ASIC 922 on the FPC 920,820', managing link-layer framing and creating the bit stream, performing cyclical redundancy checks (CRCs), and detecting link-layer errors and generating alarms, when appropriate. The FPC 920 includes another I/O manager ASIC 922. This ASIC 922 takes the packets from the PICs 910 and breaks them into (e.g., 64-byte) memory blocks. This FPC I/O manager ASIC 922 sends the blocks to a first distributed buffer manager (DBM) 935a', decoding encapsulation and protocol-specific information, counting packets and bytes for each logical circuit, verifying packet integrity, and applying class of service (CoS) rules to packets. At this point, the packet is first written to memory. More specifically, the example DBM ASIC 935a' manages and writes packets to the shared memory 924 across all FPCs 920. In parallel, the first DBM ASIC 935a' also extracts information on the destination of the packet and passes this forwarding-related information to the Internet processor 942/842'. The Internet processor 942/842' performs the route lookup using the forwarding table 944 and sends the information over to a second DBM ASIC 935b'. The Internet processor ASIC 942/842' also collects exception packets (i.e., those without a forwarding table entry) and sends them to the control component 810. The second DBM ASIC 935b' then takes this information and the 64-byte blocks and forwards them to the I/O manager ASIC 922 of the egress FPC 920/820' (or multiple egress FPCs, in the case of multicast) for reassembly. (Thus, the DBM ASICs 935a' and 935b' are responsible for managing the packet memory 924 distributed across all FPCs 920/820', extracting forwarding-related information from packets, and instructing the FPC where to forward packets.)

The I/O manager ASIC 922 on the egress FPC 920/820' may perform some value-added services. In addition to incrementing time to live ("TTL") values and re-encapsulating the packet for handling by the PIC 910, it can also apply class-of-service (CoS) rules. To do this, it may queue a pointer to the packet in one of the available queues, each having a share of link bandwidth, before applying the rules to the packet. Queuing can be based on various rules. Thus, the I/O manager ASIC 922 on the egress FPC 920/820' may be responsible for receiving the blocks from the second DBM ASIC 935b', incrementing TTL values, queuing a pointer to the packet, if necessary, before applying CoS rules, re-encapsulating the blocks, and sending the encapsulated packets to the PIC I/O manager ASIC 915.

Figure 11:
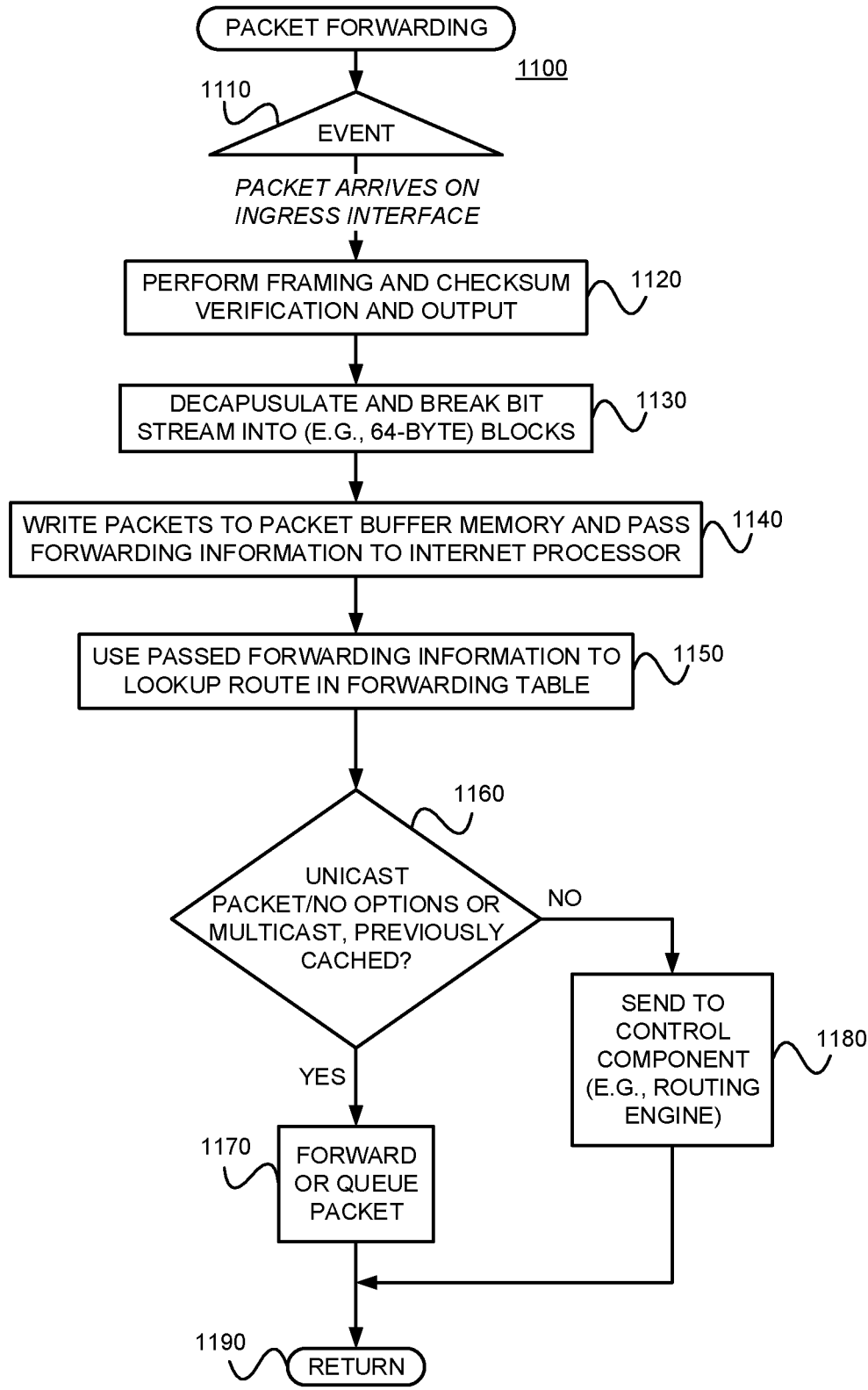
FIG. 11 is a flow diagram of an example packet forwarding method that may be implemented on any of the example routers of FIGS. 8 and 9.

FIG. 11 is a flow diagram of an example method 1100 for providing packet forwarding in the example router. The main acts of the method 1100 are triggered when a packet is received on an ingress (incoming) port or interface. (Event 1110) The types of checksum and frame checks that are required by the type of medium it serves are performed and the packet is output, as a serial bit stream. (Block 1120) The packet is then decapsulated and parsed into (e.g., 64-byte) blocks. (Block 1130) The packets are written to buffer memory and the forwarding information is passed on the Internet processor. (Block 1140) The passed forwarding information is then used to lookup a route in the forwarding table. (Block 1150) (Recall, e.g., FIGS. 7A-7D.) Note that the forwarding table can typically handle unicast packets that do not have options (e.g., accounting) set, and multicast packets for which it already has a cached entry. Thus, if it is determined that these conditions are met (YES branch of Decision 1160), the packet forwarding component finds the next hop and egress interface, and the packet is forwarded (or queued for forwarding) to the next hop via the egress interface (Block 1170) before the method 1100 is left (Node 1190) Otherwise, if these conditions are not met (NO branch of Decision 1160), the forwarding information (e.g., the packet that will go to the routing engine and invoke the Netfilter hooks) is sent to the control component 810 for advanced forwarding resolution (Block 1180) before the method 1100 is left (Node 1190). The various netfilter framework kernel hooks 110 trigger different iptables chains and/or rules as the packet forwarding method 1100 is performed.

Referring back to block 1170, the packet may be queued. Actually, as stated earlier with reference to FIG. 9, a pointer to the packet may be queued. The packet itself may remain in the shared memory. Thus, all queuing decisions and CoS rules may be applied in the absence of the actual packet. When the pointer for the packet reaches the front of the line, the I/O manager ASIC 922 may send a request for the packet to the second DBM ASIC 935b. The DBM ASIC 935 reads the blocks from shared memory and sends them to the I/O manager ASIC 922 on the FPC 920, which then serializes the bits and sends them to the media-specific ASIC of the egress interface. The I/O manager ASIC 915 on the egress PIC 910 may apply the physical-layer framing, perform the CRC, and send the bit stream out over the link.

Referring back to block 1180 of FIG. 11, as well as FIG. 9, regarding the transfer of control and exception packets, the system control board 940 handles nearly all exception packets. For example, the system control board 940 may pass exception packets to the control component 810.

Referring back to block 1150 of FIG. 11, the example method 500 may be implemented within this block. The forwarding tables (Recall, e.g., 880 and 896 of FIG. 8.) may include information such as that described with reference to FIGS. 7A-7D.

Although example embodiments consistent with the present disclosure may be implemented on the example routers of FIG. 7 or 8, embodiments consistent with the present disclosure may be implemented on communications network nodes (e.g., routers, switches, etc.) having different architectures. More generally, embodiments consistent with the present disclosure may be implemented on an example system 1200 as illustrated on FIG. 12.

Figure 12:
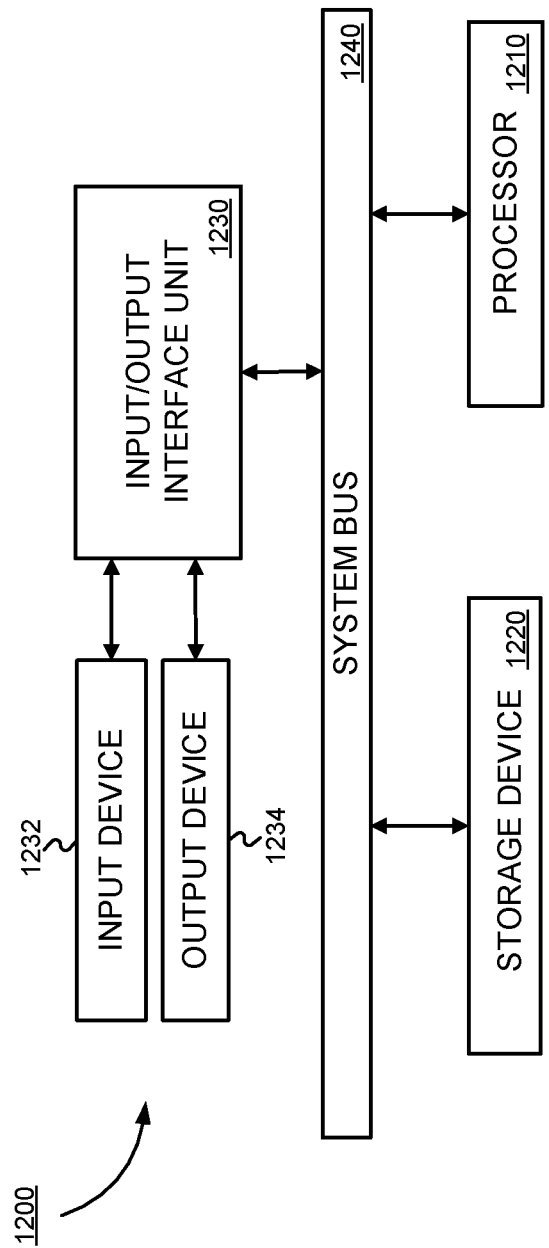
FIG. 12 is a block diagram of an example processor-based system that may be used to execute the example methods for processing

FIG. 12 is a block diagram of an exemplary machine 1200 that may perform one or more of the methods described, and/or store information used and/or generated by such methods. The exemplary machine 1200 includes one or more processors 1210, one or more input/output interface units 1230, one or more storage devices 1220, and one or more system buses and/or networks 1240 for facilitating the communication of information among the coupled elements. One or more input devices 1232 and one or more output devices 1234 may be coupled with the one or more input/output interfaces 1230. The one or more processors 1210 may execute machine-executable instructions (e.g., C or C++ running on the Linux operating system widely available from a number of vendors) to effect one or more aspects of the present disclosure. At least a portion of the machine executable instructions may be stored (temporarily or more permanently) on the one or more storage devices 1220 and/or may be received from an external source via one or more input interface units 1230. The machine executable instructions may be stored as various software modules, each module performing one or more operations. Functional software modules are examples of components which may be used in the apparatus described.

In some embodiments consistent with the present disclosure, the processors 1210 may be one or more microprocessors and/or ASICs. The bus 1240 may include a system bus.

The storage devices 1220 may include system memory, such as read only memory (ROM) and/or random access memory (RAM). The storage devices 1220 may also include a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or solid-state non-volatile storage.

Some example embodiments consistent with the present disclosure may also be provided as a machine-readable medium for storing the machine-executable instructions. The machine-readable medium may be non-transitory and may include, but is not limited to, flash memory, optical disks, CD-ROMs, DVD ROMs, RAMs, EPROMs, EEPROMs, magnetic or optical cards or any other type of machine-readable media suitable for storing electronic instructions. For example, example embodiments consistent with the present disclosure may be downloaded as a computer program which may be transferred from a remote computer (e.g., a server) to a requesting computer (e.g., a client) by way of a communication link (e.g., a modem or network connection) and stored on a non-transitory storage medium. The machine-readable medium may also be referred to as a processor-readable medium.

Example embodiments consistent with the present disclosure (or components or modules thereof) might be implemented in hardware, such as one or more field programmable gate arrays ("FPGA"s), one or more integrated circuits such as ASICs, one or more network processors, etc. Alternatively, or in addition, embodiments consistent with the present disclosure (or components or modules thereof) might be implemented as stored program instructions executed by a processor. Such hardware and/or software might be provided in an addressed data (e.g., packet, cell, etc.) forwarding device (e.g., a switch, a router, etc.), a laptop computer, desktop computer, a tablet computer, a mobile phone, or any device that has computing and networking capabilities.

§ 4.3 Example Illustrating Operations of Example Method(s)

The follow example illustrates operations of example methods consistent with the present description. Assume that a filter with two terms is expressed as follows:
root@EVOvPTX1_RE0-re0:~# cat filter_test
term icmp-term {
from {
protocol icmp;
}
then {
discard;
}
}
term tcp-term {
from {
protocol tcp;
tcp-flags syn;
}
then {
discard;
}
}

A hash could be computed for the foregoing two-term filter. Although this may be done on the configuration, alternatively, it could be on the data definition language (DDL) or domain-specific language (DSL) representation of a filter object, or any other type representation used for the filter object during a stage in filter processing/programming on a system. In the expression:
root@EVOvPTX1_RE0-re0:~# md5sum filter_test
f8b3198510eb9b1de1a467d659230881 filter_test
the second line represents the hash of the filter test filter object.

A filter such as the foregoing may typically be added to iptables as described below. An iptables chain is provided for the filter, and an iptables rule is provided for each of the two filter terms. An iptables dummy rule with the filter hash is also provided. This dummy rule could be programmed in a way where it never hits (that is, such that the rule carrying the hash value is never invoked). Alternatively, if hitting the dummy rule is expected, it can have a default action for the filter chain such as, for example, "accept," "drop," or just don't do anything and go to next rule.

Term hashes can also be added for the term rules in the comments against the rules, such as:
iptables -A test -m comment --comment "F-test_H-f8b3198510eb9b1de1a467d659230881"

The following is an example of a user-defined chain having a dummy rule including the hash value:
root@EVOvPTX1_RE0-re0:~# iptables -vL test
Chain test (1 references)
pkts bytes target prot opt in out source destination
3 252 DROP icmp -- any any anywhere anywhere /* F-test_T-icmp-term */
0 0 DROP tcp -- any any anywhere anywhere tcp flags: SYN/SYN /* F-test_T-tcp-term */
170 131726 all -- any any anywhere anywhere /* F-test_H-f8b3198510eb9b1de1a467d659230881

Lines 4 and 5 include rules for filtering out (i.e., dropping) ICMP and TCP protocol traffic. Line 6 includes the hash value of "H-f8b3198510eb9b1de1a467d659230881" for the F-test (i.e., filter test) filter.

§ 4.4 Refinements, Alternatives and Extensions

Although the forgoing discussed using hash values for synchronization across the restart of a firewall/filter application, such hash values can be used for validation of programmed filters. More specifically, filters can be validated periodically, whereby the filter content in netfilter is checked against the hash stored in the comment to ensure that any third party utility/application or user from shell (using iptables) has not modified (unintentionally) the filters previously added by the firewall application. If a change is determined during a validation check (i.e., due to mismatched hash values), an alarm can be raised.

§ 4.5 Conclusions

As should be appreciated from the foregoing, example embodiments consistent with the present description reduce the chance of synchronization errors across the restart of a firewall filter application.

What is claimed is:

1. A computer-implemented method for determining filter synchronization across a restart of a firewall filter application, the computer-implemented method comprising:
a) computing a hash value for filter information derived from a filter using either the filter or information derived from the filter;
b) determining an iptables filter table rule using the filter information for the filter;

c) associating the hash value with the iptables filter table rule;
d) adding the determined iptables filter table rule and the hash value to iptables filter table rules in a Linux kernel;
e) detecting the restart of the firewall filter application; and
f) responsive to detecting the restart of the firewall filter application,
1) obtaining a current instance of filter information derived from a current instance of the filter,
2) computing a hash value for the current instance of filter information using either the current instance of the filter or the filter information derived from the current instance of the filter;
3) obtaining, from the iptables filter table rules, the hash value for the filter information;
4) determining whether the hash value for the current instance of the filter information is the same as the hash value for the filter information, and
5) responsive to determining that the hash value for the current instance of the filter information is not the same as the hash value for the filter information, determining a new iptables filter table rule for the current instance of the filter information, and replacing, in the iptables filter table rules in the Linux kernel, the iptables filter table rule and the hash value with the new iptables filter table rule and the hash value for the current instance of the filter information.

2. The computer-implemented method of claim 1 wherein the filter information is a filter object, and wherein the current instance of the filter information is a current instance of the filter object.

3. The computer-implemented method of claim 2 wherein the filter object and the current instance of the filter object were generated by a configuration application using filter configuration information entered via a command line interface.

4. The computer-implemented method of claim 1 wherein the filter information is a filter object, and wherein the act of computing the hash value for the filter information uses contents of the filter object.

5. The computer-implemented method of claim 1 wherein the filter information is a filter object, and wherein the act of associating the hash value with the filter information includes embedding the hash value in the filter object.

6. The computer-implemented method of claim 5 wherein the hash value is embedded within a netfilter rule comment.

7. The computer-implemented method of claim 1 wherein the filter information is a filter object, and wherein the act of associating the hash value with the filter information includes attaching the hash value to the filter object.

8. The computer-implemented method of claim 1 wherein the act of determining the iptables filter table rule using the filter information is performed using the firewall filter application.

9. The computer-implemented method of claim 1 wherein the hash for the filter information is determined using a hash of a filter configuration that was either (A) entered via a command line interface, or (B) received from a centralized controller.

10. A computer-implemented method for synchronizing one or more filter rules across a restart of a firewall filter application for converting filter information for the one or more filters into one or more iptables filter table rules corresponding to the one or more filters, the computer-implemented method comprising:
a) computing, for each of the one or more filters, a hash value for the corresponding filter information;
b) determining, for each of the one or more filters, an iptables filter table rule using the filter information corresponding to the filter;
c) associating, for each of the one or more filters, the hash value with the corresponding iptables filter table rule;
d) adding each of the determined one or more iptables filter table rules and its associated hash value to iptables filter table rules in a Linux kernel;
e) detecting the restart of the firewall filter application; and
f) responsive to detecting the restart of the firewall filter application,
1) obtaining a current instance of filter information derived from a current instance of the one or more filters, and
2) for each of the current instance of the one or more filters,
A) determining whether or not the current instance of the filter already has a corresponding iptables filter table rule among the iptables filter table rules in the Linux kernel, and
B) responsive to determining that the current instance of the filter does not already have a corresponding iptables filter table rule among the iptables filter table rules in the Linux kernel,
i) computing a hash value for the current instance of the filter information corresponding to the current instance of the filter using either the current instance of the filter or information derived from the current instance of the filter,
ii) determining for the filter, a corresponding iptables filter table rule using the filter information corresponding to the filter,
iii) associating the hash value computed for the current instance of the filter information with the corresponding iptables filter table rule, and
iv) adding the determined iptables filter table rule and its associated hash value to iptables filter table rules in the Linux kernel, and
otherwise, responsive to determining that the current instance of the filter already has a corresponding iptables filter table rule among the iptables filter table rules in the Linux kernel,
i) computing a hash value for the current instance of filter information derived from the current instance of the filter;
ii) obtaining, from the iptables filter table rules in the Linux kernel, the hash value for the corresponding filter information;
iii) determining whether the hash value for the current instance of the filter information is the same as the hash value for the corresponding filter information, and
iv) responsive to determining that the hash value for the current instance of the filter information is not the same as the hash value for the corresponding filter information,
determining a new iptables filter table rule using the current instance of the filter information, and
replacing, in the iptables filter table rules in the Linux kernel, the iptables filter table rule and the hash value with the new iptables filter table rule and the hash value for the current instance of the filter information.

11. The computer-implemented method of claim 10 wherein the filter information is a filter object, and wherein the current instance of the filter information is a current instance of the filter object.

12. The computer-implemented method of claim 11 wherein the filter object and the current instance of the filter object were generated by a configuration application using filter configuration information entered via a command line interface.

13. The computer-implemented method of claim 10 wherein the filter information is a filter object, and wherein the act of computing the hash value for the filter information uses contents of the filter object.

14. The computer-implemented method of claim 10 wherein the filter information is a filter object, and wherein the act of associating the hash value with the filter information includes embedding the hash value in the filter object.

15. The computer-implemented method of claim 14 wherein the hash value is embedded within a netfilter rule comment.

16. The computer-implemented method of claim 10 wherein the filter information is a filter object, and wherein the act of associating the hash value with the filter information includes attaching the hash value to the filter object.

17. The computer-implemented method of claim 10 wherein the act of determining the corresponding iptables filter table rule using the filter information is performed using the firewall filter application.

18. The computer-implemented method of claim 10 wherein the hash for the filter information is determined using a hash of a filter configuration that was either (A) entered via a command line interface, or (B) received from a centralized controller.

19. A data forwarding device comprising:
a) a database for storing filter information for filters;
b) a firewall filter application for converting the filter information for filters stored in the database into corresponding iptables filter table rules for storage in a Linux kernel;
c) a storage device for storing processor-executable instructions; and
d) at least one processor which, when executing the processor-executable instructions,
  1) computes a hash value for the filter information using either the filter or information derived from the filter,
  2) determines an iptables filter table rule using the filter information for the filter,
  3) associates the hash value with the corresponding iptables filter table rule,
  4) adds the determined iptables filter table rule and the hash value to iptables filter table rules in the Linux kernel,
  5) detects a restart of the firewall filter application, and
  6) responsive to detecting the restart of the firewall filter application,
    A) obtains a current instance of filter information for a current instance of the filter,
    B) computes a hash value for the current instance of filter information,
    C) obtains, from the iptables filter table rules in the Linux kernel, the hash value for the filter information,
    D) determines whether the hash value for the current instance of the filter information is the same as the hash value for the filter information, and
    E) responsive to determining that the hash value for the current instance of the filter information is not the same as the hash value for the filter information,
      determines a new iptables filter table rule for the current instance of the filter information using the current instance of the filter or information derived from the current instance of the filter, and
      replaces, in the iptables filter table rules in the Linux kernel, the iptables filter table rule and the hash value with the new iptables filter table rule and the hash value for the current instance of the filter information.

* * * * *